United States Patent
Song et al.

(10) Patent No.: US 11,032,571 B2
(45) Date of Patent: Jun. 8, 2021

(54) IMAGE PROCESSING METHOD, TERMINAL, AND SERVER

(71) Applicant: Huawei Technologies Co., Ltd., Shenzhen (CN)

(72) Inventors: Yi Song, Shenzhen (CN); Qingpeng Xie, Shenzhen (CN); Peiyun Di, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/739,568

(22) Filed: Jan. 10, 2020

(65) Prior Publication Data

US 2020/0154138 A1    May 14, 2020

Related U.S. Application Data

(63) Continuation of application No. PCT/CN2018/081177, filed on Mar. 29, 2018.

(30) Foreign Application Priority Data

Jul. 31, 2017    (CN) .......................... 201710645108.X

(51) Int. Cl.
*H04N 19/15* (2014.01)
*H04N 19/597* (2014.01)
(Continued)

(52) U.S. Cl.
CPC ......... *H04N 19/597* (2014.11); *G06T 3/0037* (2013.01); *H04N 19/115* (2014.11);
(Continued)

(58) Field of Classification Search
CPC .. H04N 19/597; H04N 19/115; H04N 19/132; H04N 19/162; H04N 19/176;
(Continued)

(56) References Cited

U.S. PATENT DOCUMENTS

| | | | |
|---|---|---|---|
| 6,337,708 B1 * | 1/2002 | Furlan | H04N 5/2259 348/36 |
| 2014/0161189 A1 * | 6/2014 | Zhang | H04N 19/187 375/240.16 |

(Continued)

FOREIGN PATENT DOCUMENTS

| | | |
|---|---|---|
| CN | 105872546 A | 8/2016 |
| CN | 106063277 A | 10/2016 |

(Continued)

OTHER PUBLICATIONS

You et al, MPEG-DASH MPD for Tile-based Hybrid Stereoscopic 360-degree Video Streaming (Year: 2018).*
(Continued)

*Primary Examiner* — Shan E Elahi
(74) *Attorney, Agent, or Firm* — Conley Rose, P.C.

(57) ABSTRACT

An image processing method includes performing horizontal division and vertical division on a longitude-latitude map or a sphere map of a to-be-processed image to obtain sub-areas of the longitude-latitude map or the sphere map, where a division location of the horizontal division is a preset latitude, a division location of the vertical division is determined by a latitude, there are at least two types of vertical division intervals in an area formed by adjacent division locations of the horizontal division, and a vertical division interval is a distance between adjacent division locations of the vertical division, and encoding images of the sub-areas.

20 Claims, 18 Drawing Sheets

(51) Int. Cl.
*H04N 19/115* (2014.01)
*H04N 19/132* (2014.01)
*H04N 19/162* (2014.01)
*H04N 19/176* (2014.01)
*G06T 3/00* (2006.01)

(52) U.S. Cl.
CPC ......... *H04N 19/132* (2014.11); *H04N 19/162* (2014.11); *H04N 19/176* (2014.11)

(58) Field of Classification Search
CPC .. H04N 21/816; H04N 19/167; H04N 19/117; H04N 19/85; H04N 19/174; H04N 21/44218; H04N 21/6587; H04N 21/8456; H04N 21/845; H04N 21/2668; H04N 21/2393; H04N 21/2343; H04N 21/234363; H04N 19/146; G06T 3/0037; G06T 3/0031
USPC .................................................. 375/240.02
See application file for complete search history.

(56) References Cited

U.S. PATENT DOCUMENTS

| | | | | |
|---|---|---|---|---|
| 2015/0078450 | A1* | 3/2015 | Chen ...................... | H04N 19/52 375/240.16 |
| 2015/0215617 | A1* | 7/2015 | Leontaris ............. | H04N 19/117 375/240.03 |
| 2015/0249813 | A1* | 9/2015 | Cole ................ | H04N 21/21805 386/241 |
| 2015/0264259 | A1* | 9/2015 | Raghoebardajal .......................... | H04N 5/23238 348/36 |
| 2015/0304665 | A1* | 10/2015 | Hannuksela ......... | H04N 13/161 375/240.02 |
| 2016/0191946 | A1* | 6/2016 | Zhou .................... | H04N 19/523 375/240.16 |
| 2017/0118458 | A1* | 4/2017 | Gronholm .............. | G03B 35/08 |
| 2017/0324945 | A1 | 11/2017 | Cole et al. | |
| 2018/0007389 | A1 | 1/2018 | Izumi | |
| 2019/0045200 | A1 | 2/2019 | Hirabayashi et al. | |
| 2019/0132512 | A1* | 5/2019 | Jones ................ | H04N 5/23299 |

FOREIGN PATENT DOCUMENTS

| | | |
|---|---|---|
| CN | 106375760 A | 2/2017 |
| CN | 106530216 A | 3/2017 |
| CN | 106899840 A | 6/2017 |
| WO | 2016002496 A1 | 1/2016 |
| WO | 2016140082 A1 | 9/2016 |
| WO | 2017116952 A1 | 7/2017 |

OTHER PUBLICATIONS

Machine Translation and Abstract of Chinese Publication No. CN105872546, Aug. 17, 2016, 22 pages.
Machine Translation and Abstract of Chinese Publication No. CN106375760, Feb. 1, 2017, 18 pages.
Machine Translation and Abstract of Chinese Publication No. CN106530216, Mar. 22, 2017, 11 pages.
Machine Translation and Abstract of Chinese Publication No. CN106899840, Jun. 27, 2017, 15 pages.
"Information technology—Coding of audiovisual objects—Part 12: ISO base media file format," ISO/IEC 14496-12, Fifth edition, Dec. 15, 2015, 248 pages.
"Information technology—Dynamic adaptive streaming over HTTP (DASH)—Part 1: Media presentation description and segment formats," International Standard, ISO/IEC 23009-1, Second edition, May 15, 2014, 152 pages.
Huawei et. al., "OMAF VDC CE: Experimentation conditions on Viewport Dependent Omnidirectional Video Coding considering SHVC," ISO/IEC JTC1/SC29/WG11/M40461, MPEG 118, Apr. 2017, 6 pages.
"Series H: Audiovisual and Multimedia Systems, Infrastructure of audiovisual services—Coding of moving video, Advanced video coding for generic audiovisual services," ITU-T H.264, Telecommunication Standardization Sector of ITU, Apr. 2017, 812 pages.
"Series H: Audiovisual and Multimedia Systems, Infrastructure of audiovisual services—Coding of moving video, High efficiency video coding," ITU-T H.265, Dec. 2016, 664 pages.
Foreign Communication From a Counterpart Application, Chinese Application No. 201710645108.X, Chinese Office Action dated Mar. 4, 2020, 8 pages.
Foreign Communication From a Counterpart Application, PCT Application No. PCT/CN2018/081177, English Translation of International Search Report dated Jul. 4, 2018, 4 pages.
Foreign Communication From a Counterpart Application, PCT Application No. PCT/CN2018/081177, English Translation of Written Opinion dated Jul. 4, 2018, 6 pages.
Van Der Auwera, G., AHG8: Equatorial cylindrical projection for 360-degree video, Joint Video Exploration Team (JVET) of ITU-T SG 16 WP 3 and ISO/IEC JTC 1/SC 29/WG 11, JVET-F0026-r1, 6th Meeting: Hobart, AU, Mar. 31-Apr. 7, 2017, XP030150677, 6 pages.
Yu, M., et al., "Content Adaptive Representations of Omnidirectional Videos for Cinematic Virtual Reality," Immersive Media Experiences, ACM, 2 Penn Plaza, Suite 701 New York NY 10121-0701 USA, XP058074923, Oct. 30, 2015, 6 pages.
He, Y., et al., "AHG8: Cross-check of JVET-F0026 Equatorial cylindrical projection with tile coding for 360-degree video," Joint Video Exploration Team (JVET) of ITU-T SG 16 WP 3 and ISO/IEC JTC 1/SC 29/WG 11, JVET-F0098, 6th Meeting: Hobart, AU, XP030150776, Mar. 31-Apr. 7, 2017, 2 pages.
Champel, M., "SRD extensions for VR," XP030067041, ISO/IEC JTC1/SC29/WG11 MPEG 114/m38689, May 29, 2016, 5 pages.
Hannuksela, M., et al., "OMAF architecture," XP030067291, ISO/IEC JTC1/SC29/WG11 MPEG2016/M38943v2, Oct. 12, 2016, 6 pages.
Hannuksela, M., et al., "Virtual reality video metadata for DASH MPD," XP030067292, ISO/IEC JTC1/SC29/WG11 MPEG2016/M38944v2, Oct. 12, 2016, 7 pages.
Wang, X., et al., "Viewport Dependent Streaming in DASH," XP030068874, ISO/IEC JTC1/SC29/WG11 MPEG2016/M40529, Apr. 2, 2017, 6 pages.
Byeongdoo, C., et al., "OMAF DIS text with updates based on Berlin OMAF AHG meeting agreements," XP030069193, ISO/IEC JTC1/SC29/WG11 M40849, Jul. 2017, 70 pages.
Mook Oh, H., et al. "Region wise quality indication SEI message," XP030118197, Joint Collaborative Team on Video Coding (JCT-VC) of ITU-T SG 16 WP 3 and ISO/IEC JTC 1/SC 29/WG 11, JCTVC-AA0030, 27th Meeting: Hobart, AU, Mar. 31-Apr. 7, 2017, 4 pages.
Auwera, G., et al, "AHG8: Equatorial cylindrical projection for 360-degree video," JVET-F0026r1, Apr. 2017, 7 pages.

* cited by examiner

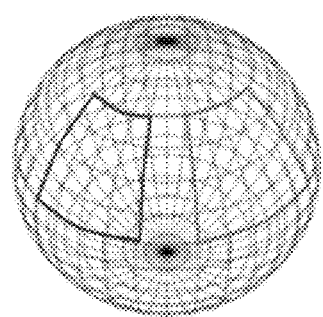
FIG. 1
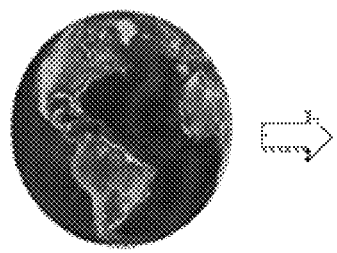 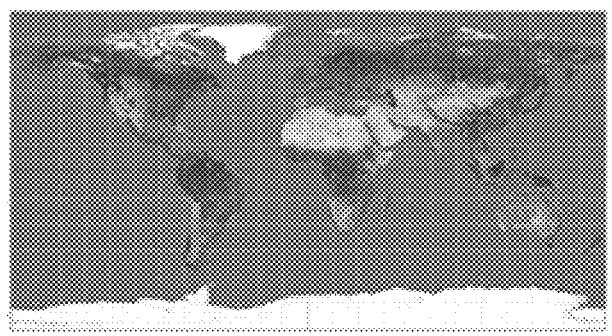
FIG. 2

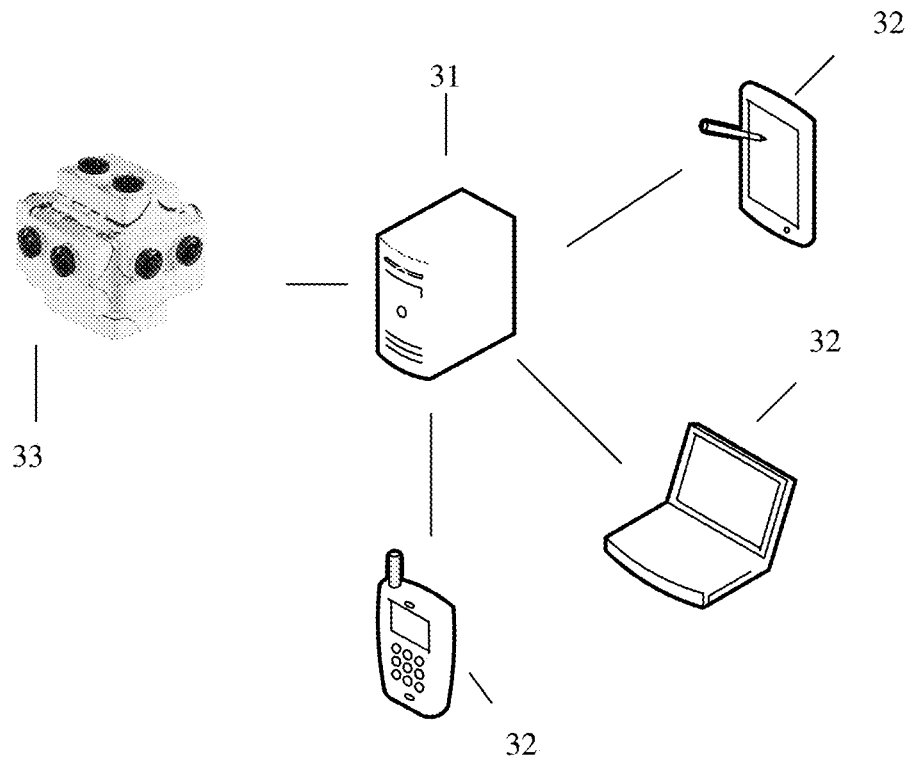

FIG. 3

| A server performs horizontal division on a longitude-latitude map of a to-be-processed image, where a division location of the horizontal division is a preset latitude | 401 |

| The server performs vertical division on the longitude-latitude map of the to-be-processed image, where a division location of the vertical division is determined by a latitude, there are at least two types of vertical division intervals in an area formed by adjacent division locations of the horizontal division, and the vertical division interval is a distance between adjacent division locations of the vertical division to obtain each sub-area of the longitude-latitude map | 402 |

| The server encodes images of the obtained sub-areas | 403 |

FIG. 4

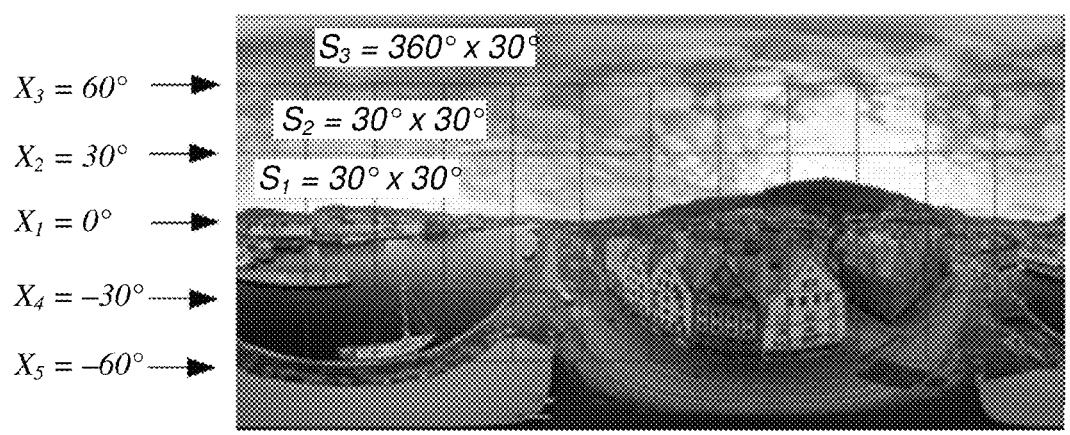
$X_3 = 60°$
$X_2 = 30°$
$X_1 = 0°$
$X_4 = -30°$
$X_5 = -60°$
$S_3 = 360° \times 30°$
$S_2 = 30° \times 30°$
$S_1 = 30° \times 30°$
FIG. 6A
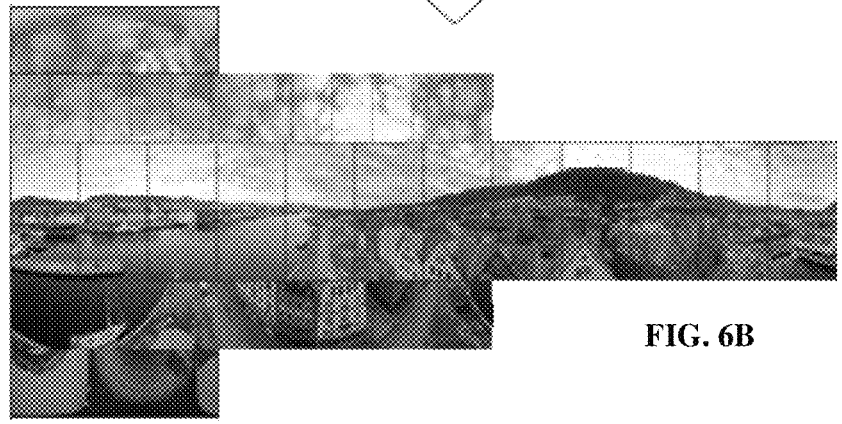
FIG. 6B

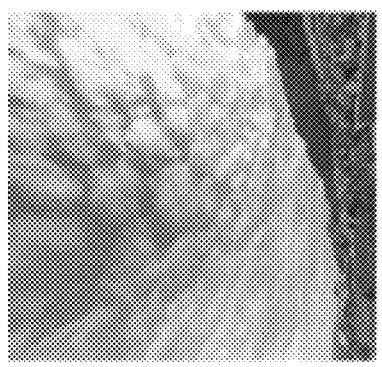
FIG. 11D
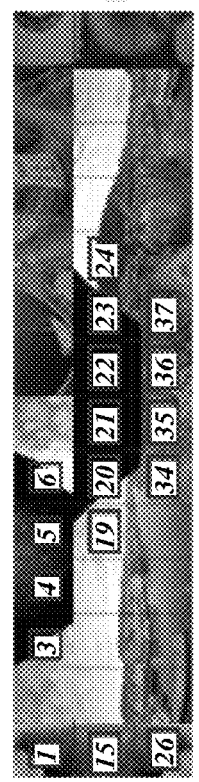
FIG. 11C
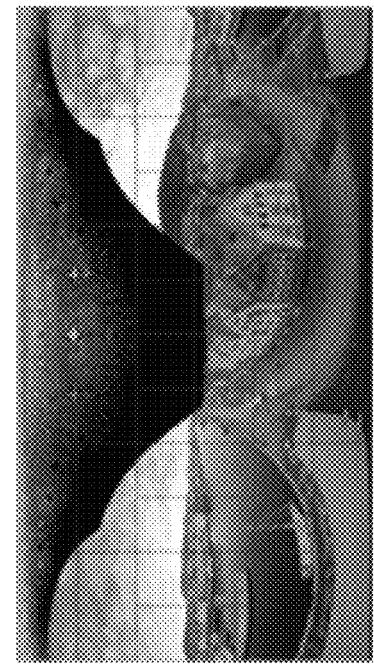
FIG. 11A
FIG. 11B

17A1 — The server stores bitstreams corresponding to images of sub-areas of a longitude-latitude map or a sphere map of a panorama image, where the sub-area is obtained by performing horizontal division and vertical division on the longitude-latitude map or the sphere map of the panorama image, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division 17A2 — The server sends, to a terminal, a bitstream of a sub-area covered by a current visual angle in the stored bitstreams that are corresponding to the images of the sub-areas and that are required by the terminal

FIG. 17A

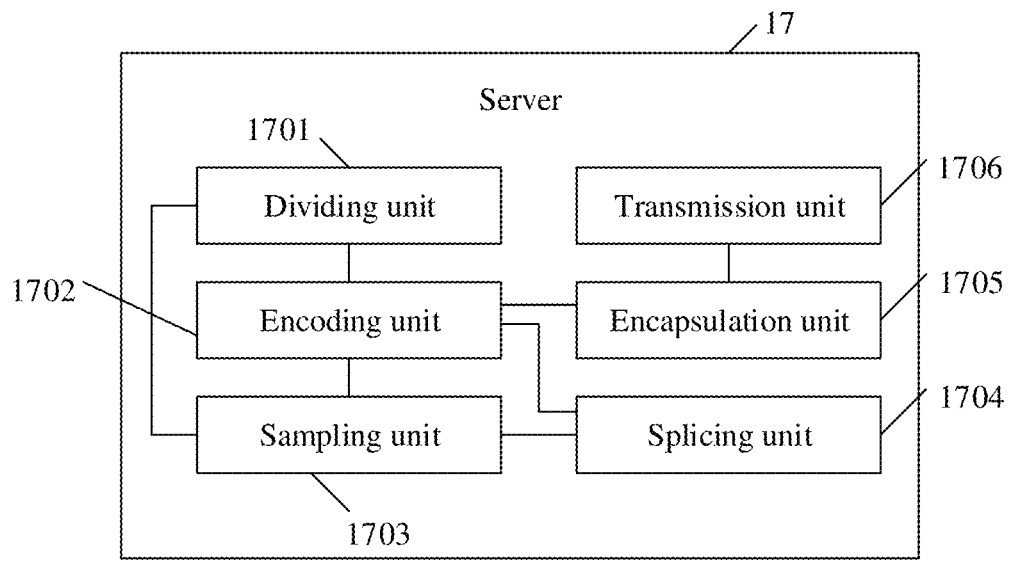

FIG. 17B

IMAGE PROCESSING METHOD, TERMINAL, AND SERVER

CROSS-REFERENCE TO RELATED APPLICATIONS

This application is a continuation of International Patent Application No. PCT/CN2018/081177 filed on Mar. 29, 2018, which claims priority to Chinese Patent Application No. 201710645108.X filed on Jul. 31, 2017. The disclosures of the aforementioned applications are hereby incorporated by reference in their entireties.

TECHNICAL FIELD

This application relates to the field of media standards and media application technologies, and in particular, to an image processing method, a terminal, and a server.

BACKGROUND

In a video application, a virtual reality (VR)/360-degree panorama video is emerging, bringing a new viewing manner and visual experience to people, and also bringing a new technical challenge. The 360-degree panorama video is photographed by a plurality of cameras on an object at a plurality of angles to support multi-angle playing. An image signal of the video may be virtualized as a spherical signal. As shown in FIG. 1, spherical image signals of different locations in a sphere may represent different visual angle content. However, a virtual spherical image signal cannot be seen by a human eye. Therefore, a three-dimensional (3D) spherical image signal needs to be represented as a two-dimensional (2D) plane image signal, for example, is represented in a representation form such as a longitude-latitude map or a cube. In these representation forms, the spherical image signal is actually mapped to a 2D image in a mapping manner such that the spherical image signal becomes an image signal that can be directly seen by a human eye. A most frequently used direct image format is the longitude-latitude map. A manner of collecting the image is as follows. A spherical image signal is evenly sampled in a horizontal direction according to a longitude angle, and is evenly sampled in a vertical direction according to a latitude angle. A spherical image signal of the earth is used as an example, and a 2D mapping image thereof is shown in FIG. 2.

In a VR application, a spherical image signal is a 360-degree panorama image, and a visual angle range of a human eye is usually about 120 degrees. Therefore, a valid spherical signal seen from a visual angle of the human eye is about 22% of a panorama signal. A VR terminal device (for example, VR glasses) can support a single visual angle between about 90 degrees to 110 degrees in order to obtain a better user viewing experience. However, when a user watches an image, image content information in a single visual angle occupies a small part of an entire panorama image, and image information outside the visual angle is not used by the user. If all panorama images are transmitted, unnecessary bandwidth waste is caused. Therefore, in a viewport dependent video coding (VDC) encoding and transmission technology of a panorama video, images in an entire video are divided, and an image sub-area that needs to be transmitted is selected according to a current visual angle of a user, thereby saving bandwidth.

The foregoing panorama video VR encoding and transmission technology may include two types: (1) Independently use a tile-wise encoding and transmission manner; (2) Perform hybrid encoding and transmission of panorama image encoding and tile-wise encoding and transmission manner. In the tile-wise encoding and transmission manner, an image sequence is divided into some image sub-areas, and all sub-areas are separately encoded to generate one or more bitstreams. A manner of evenly dividing the longitude-latitude map includes evenly dividing the longitude-latitude map into a plurality of tiles in a width direction and a height direction. When a user watches an image of a visual angle on a client, the client calculates a coverage range of the visual angle on the image based on a visual angle location of the user, and obtains, based on the range, tile information that needs to be transmitted for the image, including a location and a size of the tile in the image, and requests, from a server, bitstreams corresponding to the tiles for transmission in order to render and display the current visual angle on the client. However, when the longitude-latitude map is used for division, a sampling rate of an image near the equator is relatively high, and a sampling rate of an image near the two poles is relatively low. That is, pixel redundancy of an image near the equator is relatively low, and pixel redundancy of an image near the two poles is relatively high, and a higher latitude indicates higher redundancy. If the longitude-latitude map is used for even division, a pixel redundancy problem of the longitude-latitude map in different latitudes is not considered, each image block is encoded for transmission at a same resolution under a same condition, encoding efficiency is low, and relatively large transmission bandwidth waste is also caused.

SUMMARY

Embodiments of this application provide an image processing method, a terminal, and a server to resolve problems of low encoding efficiency and bandwidth waste during encoding and transmission that are caused when an image is evenly divided using a longitude-latitude map in image sampling.

According to a first aspect, an image processing method is provided, where the method is applied to a server and includes performing horizontal division and vertical division on a longitude-latitude map or a sphere map of a to-be-processed image to obtain sub-areas of the longitude-latitude map or the sphere map, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division, and encoding images of the obtained sub-areas. In this way, compared with the other approaches, in which a longitude-latitude map is evenly divided at a same division interval, a characteristic of meticulous division during even division causes low encoding efficiency, and a problem of occupying large bandwidth during transmission after being encoded is caused. In this application, a characteristic of even and meticulous division in the other approaches is avoided by performing vertical division based on at least two vertical division intervals in different latitudes. In this application, vertical division may be performed at a plurality of vertical division intervals such that there is a plurality of sizes of sub-areas of the image. A larger division interval indicates a larger sub-area. Encoding efficiency during encoding is improved, and after encoding, bandwidth occupied when the server transmits a bitstream to the terminal is reduced.

In a possible design, the division location of the vertical division is determined by the latitude includes that a higher latitude of a division location of the vertical division indicates a larger vertical division interval. In this way, because latitudes in which sub-areas are located are different, a higher latitude indicates a larger sub-area. A rough division can improve encoding and transmission efficiency, and reduce transmission bandwidth.

In a possible design, before encoding images of the obtained sub-areas, the method further includes sampling the image of the sub-area in a horizontal direction at a first sampling interval, where a higher latitude corresponding to the sub-area indicates a larger first sampling interval, and encoding images of the obtained sub-areas includes encoding images of sampled sub-areas. In the longitude-latitude map, because pixel redundancy of an image near the equator is relatively low, and pixel redundancy of an image near the two poles is relatively high, if each sub-area is encoded and transmitted at a same resolution, transmission bandwidth is wasted greatly. In addition, pixel redundancy of the decoding end is high, and as a result, the decoding end requires a high decoding capability, and a decoding speed is low. However, in this application, horizontal sampling may be performed before encoding, and when horizontal sampling is performed, a higher latitude corresponding to a sub-area indicates a larger first sampling interval. That is, downsampling is performed on a sub-area of a high latitude in a horizontal direction, namely, compressive sampling is performed such that pixel redundancy of an image transmitted in the sub-area of the high latitude before encoding can be reduced, thereby reducing bandwidth. In addition, downsampling reduces a pixel value that needs to be encoded and transmitted such that a requirement of the decoding end on the decoding capability is reduced. Decoding complexity is reduced, thereby improving the decoding speed.

In a possible design, before encoding images of the obtained sub-areas, the method further includes sampling the image of the sub-area in a vertical direction at a second sampling interval. The second sampling interval may be the same as an interval of a sub-area before sampling, namely, original sampling is maintained in a vertical direction, or may be smaller than the interval of the sub-area before sampling, namely, downsampling is performed in an entire vertical direction. Likewise, bandwidth of encoding and transmission may be relatively small, decoding complexity of the decoding end is reduced, and the decoding speed is improved.

In a possible design, when the sub-area is obtained by performing horizontal division and vertical division on the sphere map of the to-be-processed image, before sampling the image of the sub-area in a horizontal direction at a first sampling interval, the method further includes mapping the image of the sub-area to a 2D planar image based on a preset size, and sampling the image of the sub-area in a horizontal direction at a first sampling interval includes sampling, at the first sampling interval in a horizontal direction, the 2D planar image to which the image of the sub-area is mapped. That is, if the server collects a sphere map from the photographing device, the server may first map an image of the sub-area of the sphere map to the 2D longitude-latitude map, and then perform downsampling on the longitude-latitude map. In this case, it is assumed that the server directly collects the spherical signal from the photographing device, and the server may directly divide the sphere map into sub-areas, and then map the sub-areas of the sphere map to the longitude-latitude map, and then perform downsampling on the longitude-latitude map.

In a possible design, before encoding images of sampled sub-areas, the method further includes adjusting locations of the sampled sub-areas such that a horizontal edge and a vertical edge of an image spliced by images of adjusted sub-areas are respectively aligned. In this way, sub-areas may be numbered in sequence in the spliced image such that the server and the terminal transmit and process each sub-area based on a number of each sub-area.

In a possible design, encoding images of sampled sub-areas includes encoding a tile of the spliced image. In this way, a single bitstream may be generated for storage, or the single bitstream is divided to obtain a plurality of sub-areas for storage.

In a possible design, after encoding images of the obtained sub-areas, the method further includes independently encapsulating bitstreams corresponding to the encoded images of the sub-areas, and encoding location information of the sub-areas, where the encoded location information of all the sub-areas and the bitstreams of all the sub-areas exist in a same track, the encoded location information and a bitstream of each sub-area respectively exist in a track of the location information and a track of the bitstream, the encoded location information of all the sub-areas exists in a media presentation description (MPD), the encoded location information of all the sub-areas exists in a private file, and an address of the private file exists in an MPD, or the encoded location information of each sub-area exists in supplemental enhancement information (SEI) of a bitstream of each sub-area.

In a possible design, when the sub-area is obtained by performing horizontal division and vertical division on the longitude-latitude map of the to-be-processed image, the sampled sub-areas form a sampled longitude-latitude map, and the location information includes a location and a size of the sub-area in the longitude-latitude map, and a location and a size of the sub-area in the sampled longitude-latitude map, the location information includes a location and a size of the sub-area in the longitude-latitude map, and a location and a size of the sub-area in the spliced image, when the sub-area is obtained by performing horizontal division and vertical division on the sphere map of the to-be-processed image, the sampled sub-areas form a sampled sphere map, the location information includes a location and a latitude-longitude range of the sub-area in an image of the sphere map, and a location and a size of the sub-area in an image of the sampled sphere map, or the location information includes a location and a latitude-longitude range of the sub-area in the image of the sphere map, and a location and a size of the sub-area in the spliced image. In this way, the terminal may render and present an image based on a location and a size of the sub-area during playing and displaying.

In a possible design, the private file may further include information used to represent a correspondence between a user viewpoint and a number of a sub-area covered by a visual angle of the user viewpoint. When the terminal determines the user viewpoint, the terminal may directly determine, based on the correspondence, a sub-area covered by the visual angle of the viewpoint in order to perform decoding display based on a bitstream of the sub-area, thereby improving a decoding speed of the terminal during decoding.

In a possible design, the private file further includes information used to represent a quantity of sub-areas that need to be displayed in a sub-area covered by the visual angle of the user, information about a number of the sub-area that needs to be displayed, information about a number of a sub-area that is secondarily displayed, and information about a number of a sub-area that is not displayed. In this way, when not all bitstreams of all sub-areas can be obtained or need to be obtained due to some reasons (for example, an instable network), an image of a sub-area close to the viewpoint may be obtained for display, and image data of a sub-area that is not displayed is discarded.

In a possible design, the longitude-latitude map includes a longitude-latitude map corresponding to a left eye and a longitude-latitude map corresponding to a right eye, before performing horizontal division and vertical division on a longitude-latitude map or a sphere map of a to-be-processed image, the method further includes separating the longitude-latitude map corresponding to the left eye from the longitude-latitude map corresponding to the right eye, and performing horizontal division and vertical division on a longitude-latitude map or a sphere map of a to-be-processed image includes performing the horizontal division and the vertical division on the longitude-latitude map corresponding to the left eye, and performing the horizontal division and the vertical division on the longitude-latitude map corresponding to the right eye. In this way, a 3D video image may also be divided in the sub-area division manner in this application, to reduce bandwidth and improve efficiency of encoding and transmission.

In a possible design, the method further includes sending, to a terminal, the bitstreams corresponding to the encoded images of the sub-areas, receiving visual angle information sent by the terminal, obtaining, based on the visual angle information, a sub-area corresponding to the visual angle information, and sending a bitstream of the sub-area corresponding to the visual angle information to the terminal, or receiving a number of a sub-area that is sent by the terminal, and sending a bitstream corresponding to the number of the sub-area to the terminal. That is, the terminal may locally obtain the required bitstream corresponding to the image of the sub-area, or may send the bitstream corresponding to the sub-area to the terminal after the server determines the sub-area based on the visual angle information. Alternatively, the server is notified after the terminal determines a number of the required sub-area, and the server sends the bitstream corresponding to the sub-area to the terminal, thereby reducing computing load of the server.

In a possible design, the longitude-latitude map is a longitude-latitude map of a 360-degree panorama video image, or a part of the longitude-latitude map of the 360-degree panorama video image, or the sphere map is a sphere map of a 360-degree panorama video image, or a part of the sphere map of the 360-degree panorama video image. That is, the sub-area division manner in this application may also be applicable to division of a 180-degree half-panorama video image, thereby reducing bandwidth during transmission of the 180-degree half-panorama video image, and improving encoding and transmission efficiency.

According to a second aspect, an image processing method is provided, where the method is applied to a terminal and includes determining location information of each sub-area of a panorama image, determining, based on the determined location information of each sub-area, location information of a sub-area covered by a current visual angle in the panorama image, determining a first sampling interval of the sub-area, obtaining, based on the determined location information of the sub-area covered by the current visual angle, a bitstream corresponding to the sub-area covered by the current visual angle, decoding the bitstream to obtain an image of the sub-area covered by the current visual angle, and resampling the decoded image based on the determined location information of the sub-area covered by the current visual angle and the first sampling interval, and playing the resampled image. Therefore, the sampling interval may vary with the location of the sub-area, and is not similar to that in the other approaches in which a sub-area is obtained through even division. During decoding, an image is decoded and displayed based on a specified sampling interval. In this application, the terminal may resample the image based on different sampling intervals for display, thereby improving a display speed of an image of the decoding end.

In a possible design, determining location information of each sub-area of a panorama image includes receiving first information sent by a server, where the first information includes a track of each sub-area of the panorama image and a bitstream of each sub-area, and the track includes location information of all sub-areas of the panorama image, and obtaining the location information of each sub-area in the panorama image based on the track.

In a possible design, determining location information of each sub-area of a panorama image includes receiving an MPD sent by a server, where the MPD includes the location information of each sub-area, or the MPD includes an address of a private file, and the private file includes the location information of each sub-area, and parsing the MPD to obtain the location information of each sub-area.

In a possible design, the location information of the sub-area exists in SEI of a bitstream corresponding to the sub-area.

In a possible design, obtaining a bitstream corresponding to the sub-area covered by the current visual angle includes obtaining, from a memory of the terminal, the bitstream corresponding to the sub-area covered by the current visual angle, or requesting, from the server, to obtain the bitstream corresponding to the sub-area covered by the current visual angle.

In a possible design, requesting, from the server, to obtain the bitstream corresponding to the sub-area covered by the current visual angle includes sending information indicating the current visual angle to the server, and receiving the bitstream that is corresponding to the sub-area covered by the current visual angle and that is sent by the server, or obtaining, from the server according to a protocol preset by the terminal and the server, the bitstream corresponding to the sub-area covered by the current visual angle, where the protocol includes a correspondence between a visual angle and a sub-area covered by the visual angle such that a speed of obtaining, by the terminal from the server, the bitstream corresponding to the sub-area may be improved based on the correspondence.

In a possible design, determining a first sampling interval of the sub-area includes determining a preset sampling interval as the first sampling interval, receiving the first sampling interval from the server, or obtaining the first sampling interval based on the location information of each sub-area that is received from the server. That is, when location information of each sub-area is different from each other, a corresponding first sampling interval is also different from each other.

According to a third aspect, an image processing method is provided, the method is applied to a server and includes storing bitstreams corresponding to images of sub-areas of a longitude-latitude map or a sphere map of a panorama image, where the sub-area is obtained by performing horizontal division and vertical division on the longitude-latitude map or the sphere map of the panorama image, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division, and sending, to a terminal, a bitstream of a sub-area covered by a current visual angle in the stored bitstreams that are corresponding to the images of the sub-areas and that are required by the terminal. In this way, when the bitstream that is corresponding to an image of each sub-area and that is stored by the server is transmitted to the terminal, in this application, because a characteristic of even and meticulous division in the other approaches can be avoided in a manner of performing vertical division based on at least two vertical division intervals in different latitudes, in this application, vertical division may be performed at a plurality of vertical division intervals such that there are a plurality of sizes of sub-areas of the image. A larger division interval indicates a larger sub-area. Encoding efficiency during encoding is improved, and after encoding, bandwidth occupied when the server transmits a bitstream to the terminal is reduced.

In a possible design, before being encoded, the image that is corresponding to the sub-area and that is stored in the server is sampled in a horizontal direction at a first sampling interval, where a higher latitude corresponding to the sub-area indicates a larger first sampling interval, or the image is sampled in a vertical direction at a second sampling interval.

According to a fourth aspect, a server is provided, including a dividing unit configured to perform horizontal division and vertical division on a longitude-latitude map or a sphere map of a to-be-processed image to obtain sub-areas of the longitude-latitude map or the sphere map, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division, and an encoding unit configured to encode images of the obtained sub-areas.

In a possible design, that the division location of the vertical division is determined by the latitude includes a higher latitude of a division location of the vertical division indicates a larger vertical division interval.

In a possible design, the server further includes a sampling unit configured to sample the image of the sub-area in a horizontal direction at a first sampling interval, where a higher latitude corresponding to the sub-area indicates a larger first sampling interval, and the encoding unit is configured to encode images of sampled sub-areas.

In a possible design, the sampling unit is further configured to sample the image of the sub-area in a vertical direction at a second sampling interval.

In a possible design, the sampling unit is further configured to map the image of the sub-area to a 2D planar image based on a preset size, and sample, at the first sampling interval in a horizontal direction, the 2D planar image to which the image of the sub-area is mapped.

In a possible design, the server further includes a splicing unit configured to adjust locations of the sampled sub-areas such that a horizontal edge and a vertical edge of an image spliced by images of adjusted sub-areas are respectively aligned.

In a possible design, the encoding unit is configured to encode a tile of the spliced image.

In a possible design, an encapsulation unit is further included configured to independently encapsulate bitstreams corresponding to the encoded images of the sub-areas, and encode location information of the sub-areas, where the encoded location information of all the sub-areas and bitstreams of all the sub-areas exist in a same track, the encoded location information and a bitstream of each sub-area respectively exist in a track of the location information and a track of the bitstream, the encoded location information of all the sub-areas exists in an MPD, the encoded location information of all the sub-areas exists in a private file, and an address of the private file exists in an MPD, or the encoded location information of each sub-area exists in SEI of a bitstream of each sub-area.

In a possible design, when the sub-area is obtained by performing horizontal division and vertical division on the longitude-latitude map of the to-be-processed image, the sampled sub-areas form a sampled longitude-latitude map, and the location information includes a location and a size of the sub-area in the longitude-latitude map, and a location and a size of the sub-area in the sampled longitude-latitude map, the location information includes a location and a size of the sub-area in the longitude-latitude map, and a location and a size of the sub-area in the spliced image, or when the sub-area is obtained by performing horizontal division and vertical division on the sphere map of the to-be-processed image, the sampled sub-areas form a sampled sphere map, the location information includes a location and a latitude-longitude range of the sub-area in an image of the sphere map, and a location and a size of the sub-area in an image of the sampled sphere map, or the location information includes a location and a latitude-longitude range of the sub-area in the image of the sphere map, and a location and a size of the sub-area in the spliced image.

In a possible design, the private file may further include information used to represent a correspondence between a user viewpoint and a number of a sub-area covered by a visual angle of the user viewpoint.

In a possible design, the private file further includes information used to represent a quantity of sub-areas that need to be displayed in a sub-area covered by the visual angle of the user, information about a number of the sub-area that needs to be displayed, information about a number of a sub-area that is secondarily displayed, and information about a number of a sub-area that is not displayed.

In a possible design, the longitude-latitude map includes a longitude-latitude map corresponding to a left eye and a longitude-latitude map corresponding to a right eye, and the dividing unit is configured to separate the longitude-latitude map corresponding to the left eye from the longitude-latitude map corresponding to the right eye, and the dividing unit is configured to perform the horizontal division and the vertical division on the longitude-latitude map corresponding to the left eye, and perform the horizontal division and the vertical division on the longitude-latitude map corresponding to the right eye.

In a possible design, the server further includes a transmission unit configured to send, to a terminal, the bitstreams corresponding to the encoded images of the sub-areas, receive visual angle information sent by the terminal, obtain, based on the visual angle information, a sub-area corresponding to the visual angle information, and send a bitstream of the sub-area corresponding to the visual angle information to the terminal, or receive a number of a sub-area that is sent by the terminal, and send a bitstream corresponding to the number of the sub-area to the terminal.

In a possible design, the longitude-latitude map is a longitude-latitude map of a 360-degree panorama video image, or a part of the longitude-latitude map of the 360-degree panorama video image, or the sphere map is a sphere map of a 360-degree panorama video image, or a part of the sphere map of the 360-degree panorama video image.

According to a fifth aspect, a terminal is provided, including an obtaining unit configured to determine location information of each sub-area of a panorama image, where the obtaining unit is further configured to determine, based on the determined location information of each sub-area, location information of a sub-area covered by a current visual angle in the panorama image, and determine a first sampling interval of the sub-area, and the obtaining unit is further configured to obtain, based on the determined location information of the sub-area covered by the current visual angle, a bitstream corresponding to the sub-area covered by the current visual angle, a decoding unit configured to decode the bitstream to obtain an image of the sub-area covered by the current visual angle, a resampling unit configured to resample the decoded image based on the determined location information of the sub-area covered by the current visual angle and the first sampling interval, and a playing unit configured to play the resampled image.

In a possible design, the obtaining unit is configured to receive first information sent by a server, where the first information includes a track of each sub-area of the panorama image and a bitstream of each sub-area, and the track includes location information of all sub-areas of the panorama image, and the obtaining unit is further configured to obtain the location information of each sub-area in the panorama image based on the track.

In a possible design, the obtaining unit is configured to receive an MPD sent by a server, where the MPD includes the location information of each sub-area, or the MPD includes an address of a private file, and the private file includes the location information of each sub-area, and parse the MPD to obtain the location information of each sub-area.

In a possible design, the location information of the sub-area exists in SEI of a bitstream corresponding to the sub-area.

In a possible design, the obtaining unit is configured to obtain, from a memory of the terminal, the bitstream corresponding to the sub-area covered by the current visual angle, or request, from the server, to obtain the bitstream corresponding to the sub-area covered by the current visual angle.

In a possible design, the obtaining unit is configured to send information indicating the current visual angle to the server, and receive the bitstream that is corresponding to the sub-area covered by the current visual angle and that is sent by the server, or obtain, from the server according to a protocol preset by the terminal and the server, the bitstream corresponding to the sub-area covered by the current visual angle, where the protocol includes a correspondence between a visual angle and a sub-area covered by the visual angle.

In a possible design, the obtaining unit is configured to determine a preset sampling interval as the first sampling interval, or receive the first sampling interval from the server.

According to a sixth aspect, a server is provided and includes a storage unit configured to store bitstreams corresponding to images of sub-areas of a longitude-latitude map or a sphere map of a panorama image, where the sub-area is obtained by performing horizontal division and vertical division on the longitude-latitude map or the sphere map of the panorama image, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division, and a transmission unit configured to send, to a terminal, a bitstream of a sub-area covered by a current visual angle in the stored bitstreams that are corresponding to the images of the sub-areas and that are required by the terminal.

In a possible design, before being encoded, the image that is corresponding to the sub-area and that is stored in the server is sampled in a horizontal direction at a first sampling interval, where a higher latitude corresponding to the sub-area indicates a larger first sampling interval, or the image is sampled in a vertical direction at a second sampling interval. That is, downsampling is performed on a sub-area of a high latitude in a horizontal direction, namely, compressive sampling is performed such that pixel redundancy of an image transmitted in the sub-area of the high latitude before encoding can be reduced, thereby reducing bandwidth. In addition, downsampling reduces a pixel value that needs to be encoded and transmitted such that a requirement of the decoding end on the decoding capability is reduced. Decoding complexity is reduced, thereby improving the decoding speed.

In another aspect, an embodiment of this application provides a computer storage medium configured to store computer software instructions used by the foregoing server. The computer storage medium contains a program designed for executing the foregoing aspects.

In another aspect, an embodiment of this application provides a computer storage medium configured to store computer software instructions used by the foregoing terminal. The computer storage medium contains a program designed for executing the foregoing aspects.

According to yet another aspect, an embodiment of this application provides a computer program product including an instruction. When the instruction runs on a computer, the computer performs the methods in the foregoing aspects.

The embodiments of this application provide an image processing method, a terminal, and a server, where the method includes performing horizontal division and vertical division on a longitude-latitude map or a sphere map of a to-be-processed image, to obtain sub-areas of the longitude-latitude map or the sphere map, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division, and encoding images of the obtained sub-areas. In this way, compared with the other approaches, in which a longitude-latitude map is evenly divided at a same division interval, a characteristic of meticulous division during even division causes low encoding efficiency, and a problem of occupying large bandwidth during transmission after being encoded is caused. In this application, a characteristic of even and meticulous division in the other approaches is avoided by performing vertical division based on at least two vertical division intervals in different latitudes. In this application, vertical division may be performed at a plurality of vertical division intervals such that there is a plurality of sizes of sub-areas of the image. A larger division interval indicates a larger sub-area. Encoding efficiency during encoding is improved, and after encoding, bandwidth occupied when the server transmits a bitstream to the terminal is reduced.

BRIEF DESCRIPTION OF DRAWINGS

FIG. 1 is a schematic diagram of a 360-degree panorama image signal according to an embodiment of this application;

FIG. 2 is a schematic diagram of converting a 360-degree panorama image signal into a longitude-latitude map according to an embodiment of this application;

FIG. 3 is a schematic diagram of a network architecture according to an embodiment of this application;

FIG. 4 is a schematic flowchart of an image processing method according to an embodiment of this application;

FIG. 6A and FIG. 6B are a schematic diagram of dividing a longitude-latitude map into 50 sub-areas according to an embodiment of this application;

FIG. 11A, FIG. 11B, FIG. 11C and FIG. 11D are a schematic diagram of a decoding display process of a terminal according to an embodiment of this application;

FIG. 17A is a schematic flowchart of an image processing method according to an embodiment of this application;

FIG. 17B is a schematic structural diagram of a server according to an embodiment of this application;

DESCRIPTION OF EMBODIMENTS

Figure 5A:
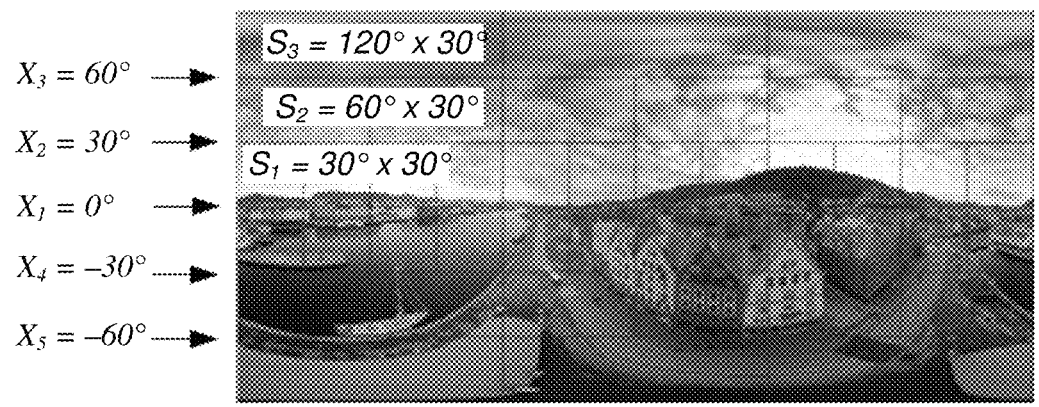
FIG. 5A, FIG. 5B and FIG. 5C are a schematic diagram of dividing a longitude-latitude map into 42 sub-areas according to an embodiment of this application.

For ease of understanding, example descriptions of some concepts related to this application are provided for reference, shown as follows.

Panorama video: A VR panorama video, also referred to as a 360-degree panorama video or a 360 video, is a video that is photographed using a plurality of cameras in a 360-degree all-round manner. When watching the video, a user may willingly adjust a direction of the video.

3D panorama video: A VR panorama video in a 3D format. The video includes two 360-degree panorama videos. One is used for a left eye, and the other is used for a right eye. The two videos have some differences in contents displayed for the left eye and the right eye in a same frame such that a user can have 3D effect during watching.

Longitude-latitude map: an equirectangular projection (ERP), a panorama image format, a 2D panorama image that is obtained by evenly sampling and mapping a spherical signal at a same longitude interval and a same latitude interval and that can be used for storage and transmission. A horizontal coordinate and a vertical coordinate of the image may be respectively represented using a latitude and a longitude. A width direction may be represented by a longitude with a span of 360°, and a height direction may be represented by a latitude with a span of 180°.

Video decoding: a processing process of restoring a video bitstream to a reconstruction image according to a specific syntax rule and processing method.

Video encoding: a processing process of compressing an image sequence into a bitstream.

Video coding: a generic name of video encoding and video decoding. A translated Chinese term of video coding is the same as that of video encoding.

Tile: a video encoding standard, namely, a block encoding area obtained by dividing a to-be-encoded image in high efficiency video coding (HEVC). One frame of image may be divided into a plurality of tiles, and the plurality of tiles form the frame of image. Each tile may be encoded independently. The tile in this application may be a tile that uses a motion-constrained tile set (MCTS) technology.

MCTS is a motion-limited tile set, and is an encoding technology for the tile. The technology limits a motion vector inside the tile during encoding such that a tile at a same location in an image sequence does not refer to an image pixel outside a region location of the tile in time domain, and therefore each tile in time domain may be independently decoded.

A sub-picture is a part of an original image that is obtained by dividing an entire image. The sub-picture in this application may be a sub-picture whose shape is a square.

Image sub-area: An image sub-area in this application may be used as a generic name of the tile or a sub-picture, and may be referred to as a sub-area for short.

VDC is visual angle-based video encoding, and is an encoding and transmission technology for panorama video encoding, namely, a method for encoding and transmission based on a visual angle of a user on a terminal.

Tile-wise encoding is a video encoding manner, and is a process in which an image sequence is divided into a plurality of image sub-areas, and all sub-areas are separately encoded to generate one or more bitstreams. The tile-wise encoding in this application may be tile-wise encoding in the VDC.

Track is a series of samples that have a time attribute and that are in an encapsulation manner based on an International Standards Organization (ISO) base media file format (ISOBMFF). For example, a video track, namely, a video sample, is a bitstream generated after each frame is encoded by a video encoder, and all video samples are encapsulated to generate samples according to a specification of the ISOBMFF.

Box may be translated as a "box", and is an object-oriented building block in the standard, and is defined by a unique type identifier and length. The box may be referred to as an "atom" in some specifications, and includes a first definition of a Moving Picture Experts Group (MPEG)-4 (MP4). The box is a basic unit of an ISOBMFF file, and the box can contain other boxes.

SEI is a type of network access unit (NALU) defined in the video encoding and decoding standards (h.264, h.265).

MPD is a document specified in the standard ISO/International Electrotechnical Commission (IEC) 23009-1, where the document includes metadata of a Hypertext Transfer Protocol (HTTP)-Uniform Resource Locator (URL) constructed by a client. The MPD includes one or more period elements. Each period element includes one or more adaptation sets (adaptationset). Each adaptation set includes one or more representations, and each representation includes one or more segments. The client selects a representation based on information in the MPD, and constructs an HTTP-URL of a segment.

ISO basic media file format includes a series of boxes. Other boxes can be included in the box. These boxes include a metadata (moov) box and a media data (mdat) box, moov box includes metadata, and the mdat box includes media data. The metadata box and the media data box may be in a same file, or may be in different files.

The embodiments of this application may be applicable to processing before encoding a panorama video or a part of the panorama video, and a process in which an encoded bitstream is encapsulated, and include a corresponding operation and processing in both a server and a terminal.

As shown in FIG. 3, a network architecture in this application may include a server 31 and a terminal 32. A photographing device 33 may also communicate with the server 31, and the photographing device 33 may be configured to shoot a 360-degree panorama video, and transmit the video to the server 31. The server 31 may perform pre-encoding processing on the panorama video, then perform encoding or transcoding operation, then encapsulate an encoded bitstream into a transportable file, and transmit the file to the terminal 32 or a content distribution network. The server 31 may further select, based on information fed back by the terminal 32 (for example, a visual angle of a user), content that needs to be transmitted for signal transmission. The terminal 32 may be an electronic device that may be connected to a network, such as VR glasses, a mobile phone, a tablet computer, a television, or a computer. The terminal 32 may receive data sent by the server 31, perform bitstream decapsulation and display after decoding, and the like.

To resolve problems that bandwidth of encoding and transmission is wasted, and a decoding capability and a speed of a decoding end are limited that is caused when an image is evenly divided based on a longitude-latitude map, this application provides an image processing method. The method may be a longitude-latitude map tile-wise dividing and processing method based on a plurality of sub-areas of images, and a corresponding encoding, transmission, and decoding display mode. In this embodiment of this application, a horizontal longitude range of the longitude-latitude map is determined as 0 to 360°, and a vertical latitude range is −90° to 90°. The negative number represents the south latitude, and the positive number represents the north latitude. As shown in FIG. 4, the method may include the following steps.

Processing before encoding:

Step 401. A server performs horizontal division on a longitude-latitude map of a to-be-processed image, where a division location of the horizontal division is a preset latitude.

The image may be a plurality of sequence images of a video.

For example, based on a video collected by the photographing device, the server obtains a longitude-latitude map of the video. As shown in FIG. 5A, the server separately draws lines of latitude at a latitude −60°, a latitude −30°, a latitude 0°, a latitude 30°, and a latitude 60° in a vertical direction of the longitude-latitude map, to horizontally divide the longitude-latitude map. In FIG. 5A, X is used to represent a latitude value, and a latitude value is 0° in an equator of the longitude-latitude map. Between a north latitude 90° and a south latitude 90°, the longitude-latitude map is horizontally divided in a north latitude 30° and a north latitude 60°, and is horizontally divided in a south latitude −60° and a south latitude −30° with a horizontal division interval of 30°. The division interval may also be understood as a division step.

Step 402. The server performs vertical division on the longitude-latitude map of the to-be-processed image, where a division location of the vertical division is determined by a latitude, there are at least two types of vertical division intervals in an area formed by adjacent division locations of the horizontal division, and the vertical division interval is a distance between adjacent division locations of the vertical division to obtain each sub-area of the longitude-latitude map.

In a possible implementation, when vertical division is performed, vertical division intervals between different latitudes may be different in a south latitude of the longitude-latitude map, and vertical division intervals between a south latitude and a corresponding north latitude may be the same. A higher latitude of a division location of the vertical division indicates a larger vertical division interval, or vertical division intervals are the same between different latitudes.

For example, for a division location of the horizontal division, for a sub-picture in a latitude range from −90° to −60° in the south latitude and in a latitude range from 60° to 90° in the north latitude, a longitude of 120° may be used as a vertical division interval to vertically divide the sub-picture to obtain three sub-areas, for a sub-picture in a latitude range from −60° to −30° and in a latitude range from 30° to 60°, a longitude of 60° is used as a vertical division interval to vertically divide the sub-picture to obtain six sub-areas, for a sub-picture in a latitude range from −30° to 0° and in a latitude range from 0° to 30°, a longitude of 30° is used as a vertical division interval to vertically divide the sub-picture to obtain 12 sub-areas. In this way, a total of 42 sub-areas are obtained after sub-area division of the entire longitude-latitude map is completed, as shown in FIG. 5A. The vertical division interval includes a longitude of 120°, a longitude of 60°, and a longitude of 30°.

In another possible implementation, different from the foregoing manner in which the sub-picture is divided, the longitude-latitude map may be divided into 50 sub-areas. For example, for a sub-picture in a latitude range from −90° to −60° and from 60° to 90°, vertical division is not performed, and a single sub-area is retained, for a sub-picture in a latitude range from −60° to −30° and from 30° to 60°, a longitude of 30° is used as a vertical division interval to vertically divide the sub-picture to obtain 12 sub-areas, for a sub-picture in a latitude range from −30° to 0° and from 0° to 30°, a longitude of 30° is used as a vertical division interval to vertically divide the sub-picture to obtain 12 sub-areas. In this way, a total of 50 sub-areas are obtained after the entire longitude-latitude map is divided, as shown in FIG. 6A. The division step includes a longitude of 30° and a longitude of 0°. When the division step is 0°, it indicates that no vertical division is performed on the sub-picture.

Step 403. The server encodes images of the obtained sub-areas.

Therefore, a characteristic of even and meticulous division, which causes low encoding efficiency, and a problem of occupying large bandwidth during transmission after being encoded can be avoided by performing vertical division based on at least two types of vertical division intervals between different latitudes in this application. The longitude-latitude map may be divided based on a plurality of vertical division intervals such that there is a plurality of sizes of sub-areas, and a larger vertical division interval indicates a larger sub-area. For example, a higher latitude of a division location of the vertical division indicates a larger vertical division interval and a larger sub-area. Encoding efficiency during encoding is improved, and a bandwidth occupied by the server to transmit a bitstream to the terminal after encoding is reduced.

Figure 7:
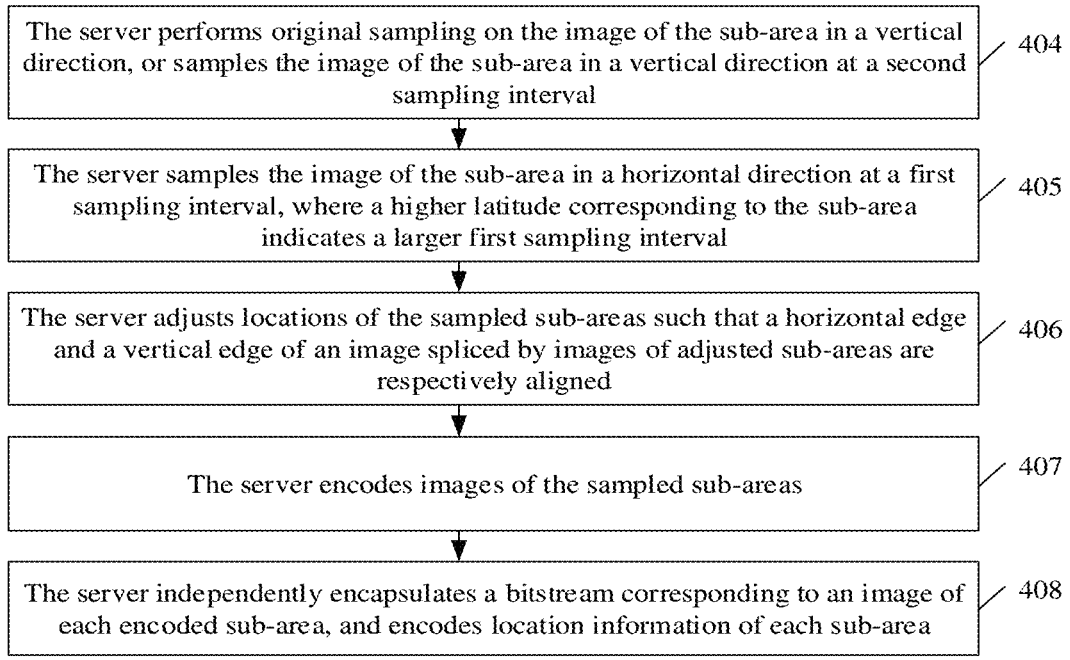
FIG. 7 is a schematic flowchart of an image processing method according to an embodiment of this application.

Further, in an existing manner of evenly dividing the longitude-latitude map, for a decoding end, namely, for a terminal, a quantity of redundant pixels obtained by the terminal is relatively large, a requirement of the terminal for a maximum decoding capability also increases, and there is a great challenge for a decoding speed. For this problem, in this application, de-redundancy may be performed on a pixel in a sub-area obtained after uneven division is performed, namely, downsampling. In this case, pixels that need to be encoded and transmitted are reduced, and the maximum decoding capability required by the decoding end is reduced, decoding complexity decreases, and a decoding speed of a decoder is improved. Therefore, as shown in FIG. 7, before step 403, the implementation method of this application may further include the following steps.

Step 404. The server performs original sampling on the image of the sub-area in a vertical direction, or samples the image of the sub-area in a vertical direction at a second sampling interval.

For example, for each sub-area obtained by dividing the longitude-latitude map shown in FIG. 5A or FIG. 6A, original sampling may be understood as keeping an image of each sub-area unchanged in a vertical direction, not performing scaling processing, or not performing processing. Sampling is performed at the second sampling interval. For example, downsampling is performed on each entire sub-area in a vertical direction. This may also be understood as sampling is performed in a vertical direction based on a given height of a sub-area.

Step 405. The server samples the image of the sub-area in a horizontal direction at a first sampling interval, where a higher latitude corresponding to the sub-area indicates a larger first sampling interval.

The first sampling interval and the second sampling interval may be preset on a server side, and the first sampling interval and the second sampling interval may be the same or different. The first sampling interval may be understood as a reciprocal of a scaling coefficient, namely, one pixel is sampled from a plurality of pixels to obtain a scaled image.

Figure 5B:
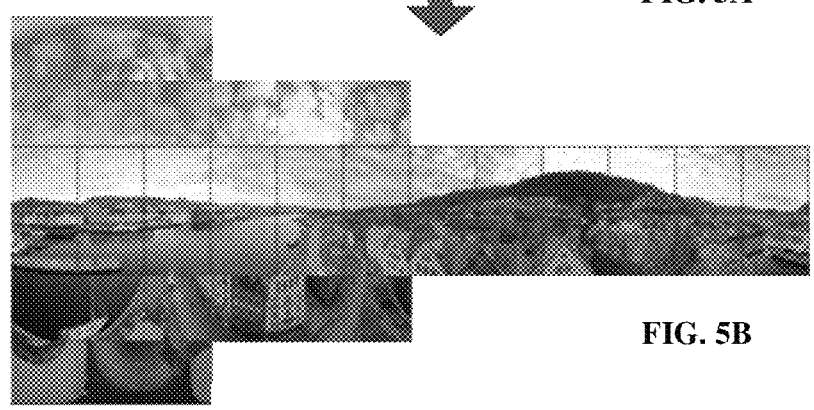

For example, for the longitude-latitude map shown in FIG. 5A, downsampling is performed horizontally on an sub-picture in a latitude range from −90° to −60° and in a latitude range from 60° to 90°, a first sampling interval is 4, namely, one pixel is sampled from every four pixels, and a scaling coefficient is ¼, downsampling is also performed horizontally on an sub-picture in a latitude range from −60° to −30° and in a latitude range from 30° to 60°, and a scaling coefficient is ½, for an sub-picture in a latitude range from −30° to 0° and in a latitude range from 0° to 30°, no horizontal scaling is performed. A finally obtained sampled image is shown in FIG. 5B. It should be noted that FIG. 5B is an image obtained after downsampling is performed on FIG. 5A only in a horizontal direction instead of a vertical direction. In this example, a first sampling interval is proportional to a latitude during horizontal sampling. That is, a higher latitude corresponding to a sub-area for a north latitude image indicates a larger first sampling interval. Similarly, a higher latitude for a south latitude image indicates a larger first sampling interval. For a south latitude image and a north latitude image, sampling intervals corresponding to a same latitude are the same.

In another example, for the longitude-latitude map shown in FIG. 6A, compared with a schematic diagram in FIG. 5B in which downsampling is performed in a vertical direction, sizes of sub-areas obtained after division and scaling are performed on the longitude-latitude map may be uneven between different latitudes. In this way, a limit in sizes of scaled sub-areas in FIG. 5B are the same may be broken, and therefore encoding and transmission efficiency of the server during encoding and transmission is improved. Further, for the longitude-latitude map shown in FIG. 6A, a sub-picture in a latitude range from −90° to −60° and in a latitude range from 60° to 90° is unchanged in a vertical direction, on which downsampling is performed at a sampling interval in a horizontal direction, and a scaling coefficient is ¼, a sub-picture in a latitude range from −60° to −30° and in a latitude range from 30° to 60° is unchanged in a vertical direction, on which downsampling is performed in a horizontal direction, and a scaling coefficient is 7/12, a sub-picture in a latitude range from −30° to 0° and in a latitude range from 0° to 30°, scaling is not performed, namely, scaling is performed neither in a vertical direction nor a horizontal direction, and a finally obtained scaled image is shown in FIG. 6B.

Optionally, a scaled longitude-latitude map is irregular as shown in FIG. 5B and FIG. 6B. Therefore, in this application, a scaled sub-area may be relocated and combined to form a preset image. Therefore, the method may further include the following steps.

Step 406. The server adjusts locations of the sampled sub-areas such that a horizontal edge and a vertical edge of an image spliced by images of adjusted sub-areas are respectively aligned.

Figure 5C:
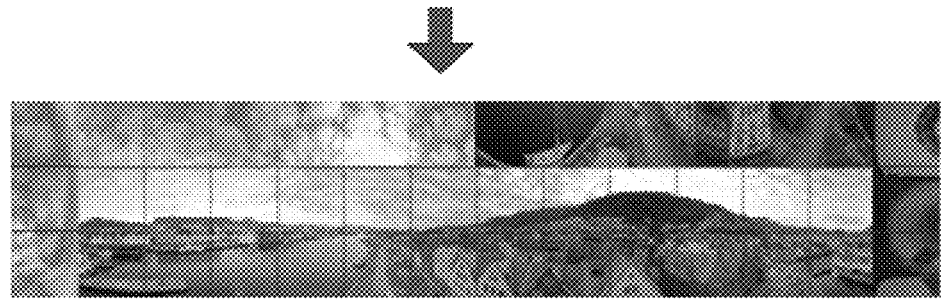

For example, for the longitude-latitude map shown in FIG. 5B, a location-adjusted image may be shown in FIG. 5C.

Step 403 may be replaced with the following step.

Step 407. The server encodes images of the sampled sub-areas.

For example, in 42 sub-areas in FIG. 5B that are obtained after division and scaling are performed on sub-areas, or in recombined 42 sub-areas in FIG. 5C, each sub-area may be encoded. There may be two encoding manners. (1) A sub-picture encoding manner, namely, separately encoding each sub-picture sequence to generate 42 sub-bitstreams, namely, each sub-picture corresponds to one bitstream. The sub-picture may be the foregoing sub-area, namely, separately encoding the 42 sub-areas to obtain a bitstream corresponding to each sub-area. (2) Perform tile mode encoding on an entire image. An MCTS technology may be used during encoding to generate a single bitstream of the entire image for storage, or a single bitstream is divided to obtain 42 sub-bitstreams for storage. The entire image herein may be an image obtained after a source longitude-latitude map is sampled and scaled, as shown in FIG. 5B, or may be a regular image obtained after recombining the image that is sampled and scaled, as shown in FIG. 5C.

After encoding the image, the server further needs to encapsulate a bitstream of each encoded sub-area. Therefore, the manner may further include the following steps.

Step 408. The server independently encapsulates a bitstream corresponding to an image of each encoded sub-area, and encodes location information of each sub-area.

The server may encapsulate bitstreams of all sub-areas into one track, namely, a track. For example, the bitstreams are encapsulated into a tile track, or may be respectively encapsulated into tracks corresponding to the bitstreams. The location information of the sub-area may be understood as description information of a sub-area division manner, and encoded location information of all sub-areas and bitstreams of all the sub-areas may exist in a same track, encoded location information and a bitstream of each sub-area respectively exist in a track of the location information and a track of the bitstream, encoded location information of all the sub-areas exists in an MPD, encoded location information of all the sub-areas may exist in a private file, and an address of the private file exists in an MPD, or encoded location information of each sub-area exists in SEI of a bitstream of each sub-area. A storage manner of the location information of the sub-area is not limited in this application.

When the sub-area is obtained by performing horizontal division and vertical division on the longitude-latitude map of the to-be-processed image, the sampled sub-areas form a sampled longitude-latitude map, and the location information includes a location and a size of the sub-area in the longitude-latitude map, and a location and a size of the sub-area in the sampled longitude-latitude map, or the location information includes a location and a size of the sub-area in the longitude-latitude map, and a location and a size of the sub-area in the spliced image. The size may include a width and a height.

The following separately describes various storage manners of the location information of the foregoing sub-area.

Manner 1: The location information of all the sub-areas is stored in one track. Description information of all sub-area division manners may be added to a track of the spliced image. For example, the following syntax is added to a moov box of the track of the spliced image:

```
aligned(8) class RectRegionPacking(i) {
    unsigned int(16) proj_reg_width[i];
    unsigned int(16) proj_reg_height[i];
    unsigned int(16) proj_reg_top[i];
    unsigned int(16) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
``` where RectRegionPacking (i) describes division information of an $i^{th}$ sub-area.

proj_reg_width[i] and proj_reg_height[i] describe a corresponding width and a corresponding height of the $i^{th}$ sub-area in the sampled image in a source image, namely, a longitude-latitude map before sampling (for example, FIG. 5A), for example, a corresponding width and a corresponding height of the sub-area that is in FIG. 5B and in FIG. 5A. For example, for a longitude-latitude map with a width of 3840 and a height of 1920, a width and a height of a first sub-area in the upper left corner of FIG. 5B in the source image is (1280, 320).

proj_reg_top[i] and proj_reg_left[i] describe a corresponding location of a pixel that is in the left upper corner of the $i^{th}$ sub-area in the sampled image in the source image, for example, a corresponding location of a left upper point of the sub-area that is in FIG. 5B and in FIG. 5A. For example, a location of a first sub-area that is in the left upper corner of FIG. 5B in the source image is (0,0). The location is obtained using the upper left corner of the source image as a coordinate (0,0).

transform_type[i] describes that the $i^{th}$ sub-area in the sampled image is transformed from a corresponding location in the source image. For example, the $i^{th}$ sub-area is obtained by performing the following operations on a corresponding area in the source image retaining/rotating for 90 degree/rotating for 180 degree/rotating for 270 degree/horizontal mirroring/rotating for 90 degrees after horizontal mirroring/rotating for 180 degrees after horizontal mirroring/rotating for 270 degrees after horizontal mirroring.

packed_reg_width[i] and packed_reg_height[i] describe a width and a height of the $i^{th}$ sub-area that is in the sampled image in a combined regular image, namely, a width and a height of the sub-area in FIG. 5C. For example, a width and a height of a first sub-area in the upper left corner in FIG. 5B are (320, 320) in a combined regular image. It should be noted that when step 406 is not performed, the image obtained after sub-areas are combined is FIG. 5B, and the width and the height are a width and a height in FIG. 5B.

packed_reg_top[i] and packed_reg_left[i] describe a relative location of a pixel that is in the upper left corner of the $i^{th}$ sub-area in the sampled image in a regular image obtained after sub-areas are combined, namely, an upper left point of each sub-area in FIG. 5C. It should be noted that when step 406 is not performed, the image obtained after sub-areas are combined is FIG. 5B, and the location is a location in FIG. 5B.

Manner 2: When location information of each sub-area is stored in a track corresponding to the sub-area, a corresponding sub-area division manner may be described in a tile track. Further, the following syntax may be added to a moov box in the tile track:

```
aligned(8) class SubPictureCompositionBox extends
TrackGroupTypeBox ('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
    unsigned int(16) proj_tile_x;
    unsigned int(16) proj_tile_y;
    unsigned int(16) proj_tile_width;
    unsigned int(16) proj_tile_height;
    unsigned int(16) proj_width;
    unsigned int(16) proj_height;
}
``` track_x and track_y describe a location of a pixel that is in the upper left corner of a sub-area of a current track in a regular image obtained after sub-areas are combined, namely, an upper left point of a current sub-area in FIG. 5C.

track_width and track_height describe a width and a height of a sub-area of a current track in a regular image obtained after sub-areas are combined, namely, a width and a height of a current sub-area in FIG. 5C.

composition_width and composition_height describe a width and a height of a regular image obtained after sub-areas are combined, namely, a width and a height of an image in FIG. 5C.

proj_tile_x and proj_tile_y describe a location of a pixel that is in the upper left corner of a sub-area of a current track in the source image, namely, an upper left point of a current sub-area in FIG. 5A.

proj_tile_width and proj_tile_height describe a width and a height of a sub-area of a current track in the source image, namely, a width and a height of a current sub-area in FIG. 5A.

proj_width and proj_height describe a width and a height of the source image, namely, a width and a height of the image in FIG. 5A.

Manner 3: Location information of all the sub-areas is stored in the MPD, namely, a sub-area division manner is described in the MPD.

Syntax in the MPD may be:

```
<?xml version="1.0" encoding="UTF-8"?>
<MPD
    xmlns="urn:mpeg:dash:schema:mpd:2011"
    type="static"
    mediaPresentationDuration,"PT10S"
    minBufferTime="PT1S"
    profiles="urn:mpeg:dash:profile:isoff-on-demand:2011">
    <Period>
        <!-- source image description -->
        <AdaptationSet segmentAlignment="true"
subsegmentAlignment="true" subsegmentStartsWithSAP="1">
            <EssentialProperty schemeIdUri="urn:mpeg:dash:
srd:2014" value="0,0,0,3840,1920,3840,1920"/>
            <Representation mimeType="video/mp4" codecs=
"avc1.42c00d" width="3840" height="1920" bandwidth="79707"
startWithSAP="1">
            <EssentialProperty schemeIdUri="urn:mpeg:mpegB:
OmvProjection" value="0 "/>
                <BaseURL> src.mp4</BaseURL>
                <SegmentBase indexRangeExact="true"
indexRange="837-988"/>
            </Representation>
        </AdaptationSet>
        <!-- Tile 1 -->
        <AdaptationSet segmentAlignment="true"
subsegmentAlignment="true" subsegmentStartsWithSAP="1">
            <EssentialProperty schemeIdUri ="urn:mpeg:dash:
srd:2014" value="0,0,0,1280,320,3840,1920"/>
            <Representation mimeType="video/mp4" codecs=
"avc1.42c00d" width="1280" height="320" bandwidth="79707"
startWithSAP="1">
<EssentialProperty schemeIdUri="urn:mpeg:mpegB:
OmvProjection" value="0"/>
<BaseURL> tile1.mp4</BaseURL>
<SegmentBase indexRangeExact="true" indexRange="837-988"/>
            </Representation>
        </AdaptationSet>
        <!-- Tile 2-->
<AdaptationSet segmentAlignment="true" subsegmentAlignment=
"true" subsegmentStartsWithSAP="1">
            <EssentialProperty schemeIdUri="urn:mpeg:dash:srd:
2014" value="0,1280,0,1280,320,3840,1920"/>
            <Representation mimeType="video/mp4" codecs=
"avc1.42c00d" width="1280" height="320" bandwidth="79707"
startWithSAP="1">
            <EssentialProperty schemeIdUri="urn:mpeg:mpegB:
OmvProjection" value="0"/>
                <BaseURL> tile2.mp4</BaseURL>
                <SegmentBase indexRangeExact="true" indexRange=
"837-988"/>
            </Representation>
        </AdaptationSet>
        ...
    </Period>
</MPD>
```

In the syntax of the manner 3, a semantics of <value="0, 1280,0,1280,320,3840,1920"> is as follows. A first 0 represents a source identifier, and a same source identifier represents a same source, namely, a same source image, "1280,0" represents a coordinate of an upper left location of a sub-area in the current representation in the source image, "1280,320" represents a width and a height of the sub-area in the current representation, and "3840,1920" represents a width and a height of the source image.

In the foregoing MPD, a 2D image is used to describe a location of an image that is in a bitstream corresponding to the sub-area in a source video image. Optionally, a location of the sub-area in the source image may be represented using a spherical coordinate. For example, information in the foregoing value is converted into spherical information, for example, value="0,0,30,0,120,30". A specific semantics is as follows. A first 0 represents a source identifier, and a same source identifier value represents a same source, "0,30,0" represents a coordinate of a central point of an area corresponding to the sub-area on a sphere (a yaw angle, a pitch angle, and a rotation angle), and "120,30" represents a width angle and a height angle of the sub-area.

Manner 4: Location information of all the sub-areas is stored in a private file, and an address of the private file is stored in the MPD. That is, the address of the private file that stores description information of sub-area division is written into the MPD by specifying a file link in the MPD.

Syntax may be as follows:

```
<? xml version"1.0" encoding="UTF-8"?>
<MPD
    xmlns="urn:mpeg:dash:schema:mpd:2011"
    type="static"
    mediaPresentationDuration,"PT10S"
    minBufferTime="PT1S"
    profiles="urn:mpeg:dash:profile:isoff-on-demand:2011">
    <Period>
        <AdaptationSet segmentAlignment="true"
subsegmentAlignment="true" subsegmentStartsWithSAP="1">
            <EssentialProperty schemeIdUri="urn:mpeg:dash:tile:2014"
value="tile_info.dat"/>
            <Representation mimeType="video/mp4" codecs=
"avc1.42c00d" width="3840" height="1920" bandwidth="79707"
startWithSAP="1">
            <EssentialProperty schemeIdUri="urn:mpeg:mpegB:
OmvProjection"value="0 "/>
                <BaseURL> src.mp4</BaseURL>
                <SegmentBase indexRangeExact="true" indexRange=
"837-988"/>
            </Representation>
        </AdaptationSet>
        ...
    </Period>
</MPD>
```

In manner 4, the division information of the sub-area is stored in a private file tile_info.dat. Data of sub-area division information stored in the file may be specified by a user, which is not limited herein. For example, stored content may be stored in one of the following manners:

(file<tile_info.dat>content)
unsigned int(16) tile_num;
unsigned int(32) pic_width;
unsigned int(32) pic_height;
unsigned int(32) comp_width;
unsigned int(32) comp_height;
unsigned int(32) tile_pic_width[];
unsigned int(32) tile_pic_height[];
unsigned int(32) tile_comp_width[];
unsigned int(32) tile_comp_height[];

Foregoing data indicates the following meanings.

tile_num represents a quantity of divided sub-areas.

pic_width represents a width of a source image, namely, a width of an image in FIG. 5A.

pic_height represents a height of the source image, namely, a height of an image in FIG. 5A.

comp_width represents a width of a regular image obtained after sub-areas are combined, namely, a width of an image in FIG. 5C.

comp_height represents a height of a regular image obtained after sub-areas are combined, namely, a height of an image in FIG. 5C.

tile_pic_width[ ] is an array representing a width of each sub-area in the source image, and a quantity of elements should be a tile_num value.

tile_pic_height[ ] is an array representing a height of each sub-area in the source image, and a quantity of elements should be a tile_num value.

tile_comp_width[ ] is an array representing a width of each sub-area in a regular image obtained after sub-areas are combined, and a quantity of elements should be a tile_num value.

tile_comp_height[ ] is an array representing a height of each sub-area in a regular image obtained after sub-areas are combined, and a quantity of elements should be a tile_num value.

In manner 4, a URL of the private file is written into the MPD by specifying a new EssentialProperty attribute Tile@value. Tile@value attribute description may be shown in Table 1. When the terminal requests a video content, a private file is obtained by parsing the element in order to obtain information such as a sub-area division manner and location.

TABLE 1

| Tile@value attribute description in "urn:mpeg:dash:tile:2014" | |
|---|---|
| Tile@value information | Description specifies information of tiles |

Manner 5: Location information of each sub-area is stored in SEI of a bitstream of each sub-area, namely, a division manner of transmitting a sub-area by writing the location information of the sub-area into the SEI of the bitstream. Based on division information of the sub-area in the image, a setting of an SEI syntax element may be shown in Table 2.

TABLE 2

| SEI syntax element based on the sub-area division information Table 2A: Total SEI syntax |  |
|---|---|
| sei_payload( payloadType, payloadSize ) { | Descriptor |
| if( nal_unit_type == PREFIX_SEI_NUT ) if( payloadType == 0) | |

TABLE 2-continued

| SEI syntax element based on the sub-area division information Table 2A: Total SEI syntax |  |
|---|---|
| sei_payload( payloadType, payloadSize ) { | Descriptor |
|     buffering_period( payloadSize ) ... | |
|   else if( payloadType == 154 )     mcts_extraction_info_nesting( payloadSize )   else if( payloadType == 155)     tile_wise_mapping_info ( payloadSize ) ... | |
|   else if( payloadType == 160 )     layers_not_present( payloadSize ) /* specified in Annex F */ } } | |

TABLE 2B

| Sub-area division information SEI syntax | |
|---|---|
| tile_wise_mapping_info ( payloadSize ) { | Descriptor |
| src_pic_width | ue(v) |
| src_pic_height | ue(v) |
| src_tile_x | ue(v) |
| src_tile_y | ue(v) |
| src_tile_width | ue(v) |
| src_tile_height | ue(v) |
| packed_pic_width | ue(v) |
| packed_pic_height | ue(v) |
| packed_tile_x | ue(v) |
| packed_tile_y | ue(v) |
| packed_tile_width | ue(v) |
| packed_tile_height | ue(v) |
| } | |

In Table 2A and Table 2B, a new type 155 is added to an SEI type, indicating that a current bitstream is a sub-area bitstream, and information tile_wise_mapping_info (payloadSize) is added, an included syntax element meaning is as follows.

src_pic_width represents a width of the source image, namely, a width of the image in FIG. 5A.

src_pic_height represents a height of the source image, namely, a height of the image in FIG. 5A.

src_tile_x represents a horizontal coordinate of an upper left corner of a current sub-area on the source image, namely, the horizontal coordinate of the current sub-area in FIG. 5A.

src_tile_y represents a vertical coordinate of an upper left corner of a current sub-area on the source image, namely, the vertical coordinate of the current sub-area in FIG. 5A.

src_tile_width represents a width of the current sub-area on the source image.

src_tile_height represents a height of the current sub-area on the source image.

packed_pic_width represents a width of a regular image obtained after sub-areas are combined, namely, a width of an image in FIG. 5C.

packed_pic_height represents a height of a regular image obtained after sub-areas are combined, namely, a height of an image in FIG. 5C.

packed_tile_x represents a horizontal coordinate of an upper left corner of a current sub-area on the combined regular image, namely, the horizontal coordinate of the current sub-area in FIG. 5C.

packed_tile_y represents a vertical coordinate of an upper left corner of a current sub-area on the combined regular image, namely, the vertical coordinate of the current sub-area in FIG. 5C.

packed_tile_width represents a width of the current sub-area on the combined regular image.

packed_tile_height represents a height of the current sub-area on the combined regular image.

In addition, the foregoing manner 4 may be extended in this application, and in the MPD, a URL of a private file that stores location information of the sub-area may be specified using a new element.

Extension manner 4: The address of the private file that stores sub-area division information is written into the MPD by specifying a file link in the MPD. Syntax may be:

```
<? xml version="1.0" encoding="UTF-8"? >
<MPD
    xmlns="urn:mpeg:dash:schema:mpd:2011"
    type,"static"
    mediaPresentationDuration,"PT10S"
    minBufferTime="PT1S"
    profiles="urn:mpeg:dash:profile:isoff-on-demand:2011">
    <Period>
        <AdaptationSet segmentAlignment="true"
subsegmentAlignment="true" subsegmentStartsWithSAP="1">
        <EssentialProperty schemeIdUri="urn:mpeg:dash:srd:
2014" value="0,1,1,0"/>
        <Representation mimeType="video/mp4" codecs=
"avc1.42c00d" width="3840" height="1920" bandwidth="79707"
startWithSAP="1"/>
            <UserdataList>
                <UserdataURL dat="tile_info.dat" />
            </UserdataList>
            </Representation>
        </AdaptationSet>
        ...
        </Period>
</MPD>
```

In extension manner 4, the location information of the sub-area is stored in a private file tile_info.dat, a syntax element <UserdataList> (referring to Table 3) is added, including a UserdataURL element, and the private file is written into the MPD. When the terminal requests a video content, the private file is obtained by parsing <UserdataList> in order to obtain information such as a sub-area division manner and location.

TABLE 3

Description of a syntax element ExtentdataList

| Element or Attribute Name | Use | Description |
|---|---|---|
| UserdataList | | specifies user data information |
| UserdataURL | 0 . . . N | specifies a user data URL |

The description information of the sub-area division manner in the foregoing manner 4 may be extended. The extension is for content in a transmitted private file tile_info.dat, and a relationship table between a visual angle of a user and a required sub-area is added such that the terminal can request a corresponding sub-area bitstream more quickly. That is, the private file may further include information used to represent a correspondence between a user viewpoint and a number of a sub-area covered by a visual angle of the user viewpoint.

Figure 8:
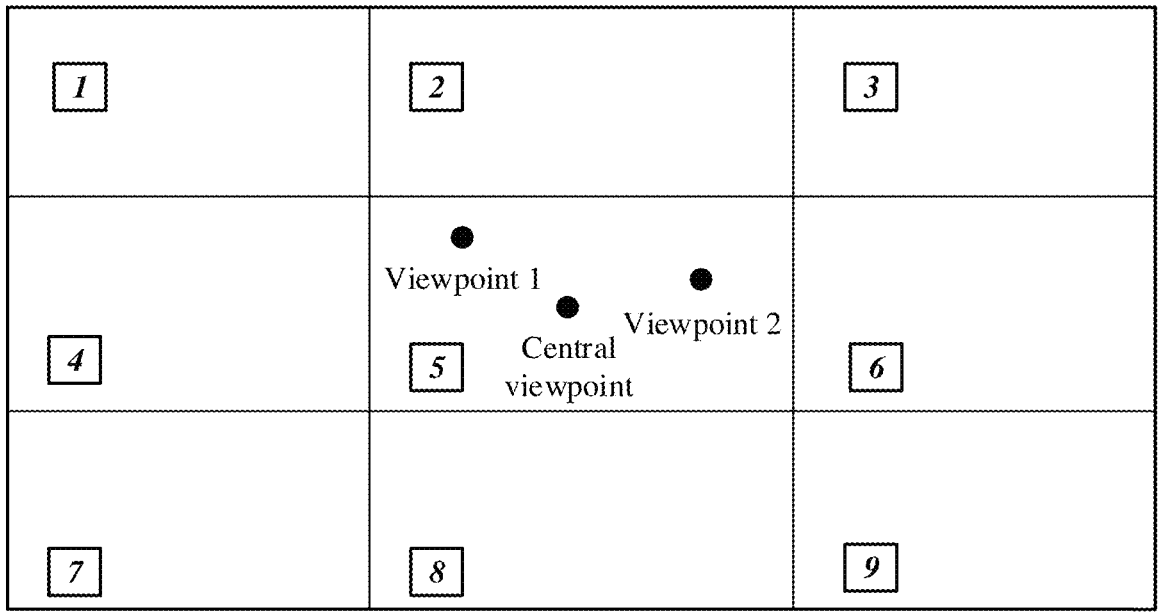
FIG. 8 is a schematic diagram of a viewpoint area of a longitude-latitude map according to an embodiment of this application.

In this example, for a private file tile_info.dat, sub-area division information content remains unchanged, and a relationship table between a visual angle of a user and a required sub-area and a correspondence between a user viewpoint and a number of a sub-area covered by a visual angle of the user viewpoint are added. For example, the stored content may be in one of the following manners:

(file<tile_info.dat>content)
unsigned int(16) tile_num;
unsigned int(32) pic_width;
unsigned int(32) pic_height;
unsigned int(32) comp_width;
unsigned int(32) comp_height;
unsigned int(32) tile_pic_width[];
unsigned int(32) tile_pic_height[];
unsigned int(32) tile_comp_width[];
unsigned int(32) tile_comp_height[];
unsigned int(16) deg_step_latitude;
unsigned int(16) deg_step_longitude;
unsigned int(32) view_tile_num;
unsigned int(16) viewport_table[][];

Compared with manner 4, added data are respectively deg_step_latitude, deg_step_longitude, view_tile_num, and viewport_table[][], and meanings of the data are as follows.

deg_step_latitude represents a step of a viewpoint area divided in a latitude direction, where the step divides a latitude range from −90° to 90° into a plurality of viewpoint areas. The viewpoint area is an area range of a viewpoint on a longitude-latitude map. In a same viewpoint area, sub-area bitstreams of an image that is obtained by the terminal and that covers the viewpoint area are the same. As shown in FIG. 8, an entire longitude-latitude map is divided into nine viewpoint areas. Both a viewpoint 1 and a viewpoint 2 belong to a fifth viewpoint area, and a viewpoint in a center of the viewpoint area 5 is marked in FIG. 8. For all viewpoints within a range of the viewpoint area 5, a corresponding visual angle coverage range is calculated as a range covered by a visual angle corresponding to a central viewpoint.

deg_step_longitude represents a step of a viewpoint area divided in a latitude direction, where the step divides a longitude range from 0° to 360° into a plurality of viewpoint areas. Both deg_step_latitude and deg_step_longitude determine a quantity of viewpoint areas.

view_tile_num represents a maximum quantity of sub-areas that can be covered when a single visual angle changes.

viewport_table[] is an array, used to store a relationship table between a viewpoint area and a number of an image sub-area covered by the viewpoint area. A total quantity of data in the table should be a quantity of viewpoint areas multiplied by view_tile_num.

An example storage manner of a data table viewport_table[][] is as follows:

```
viewport_table[100][18] = 1
    1, 2, 3, 4, 5, 6, 7, 8, 9, 10, 13, 16, 19, 0, 0, 0, 0, 0,
    1, 2, 3, 4, 5, 6, 7, 8, 9, 12, 15, 18, 21, 0, 0, 0, 0, 0,
    ...
    5, 6, 7, 13, 14, 15, 16, 25, 26, 27, 28, 35, 36, 37, 0, 0, 0, 0,
    ...
}
```

Figure 9:
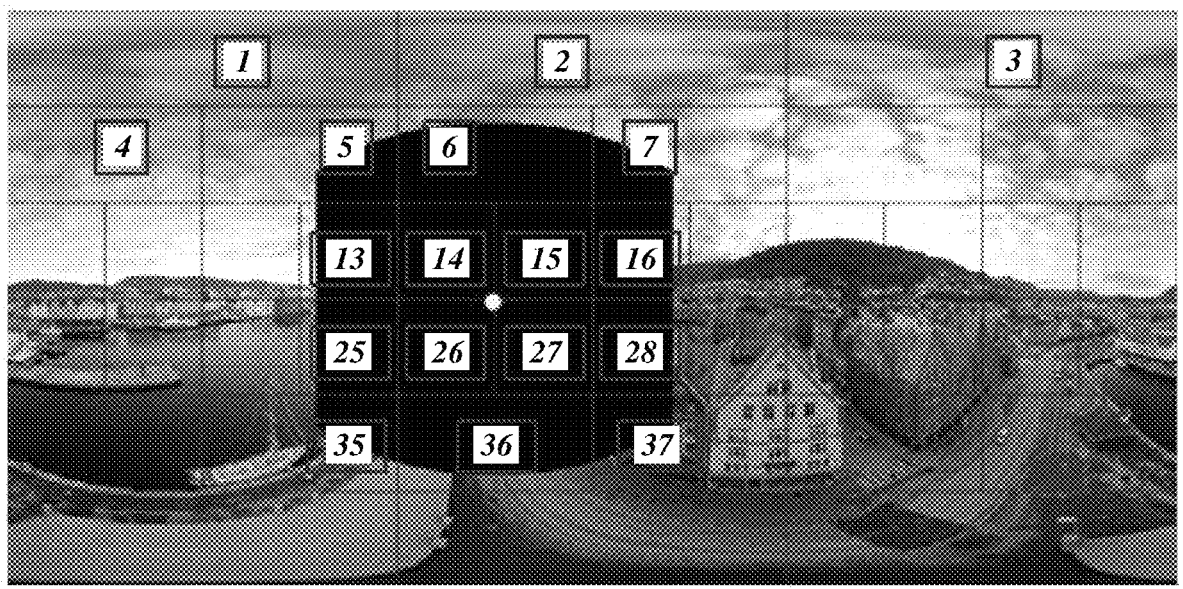
FIG. 9 is a schematic diagram of a sub-area covered by a visual angle according to an embodiment of this application.

A quantity of viewpoint areas in the table is 100, and view_tile_num=18. 18 numbers in each row of the data table represents numbers of sub-areas covered by a visual angle of a viewpoint. A number 0 indicates that less than 18 sub-areas can cover the visual angle, and a blank value is filled with 0. For example, a viewpoint shown in FIG. 9 is located at a visual angle with a latitude of 0° and a longitude of 150°, and covered sub-areas are numbered 5, 6, 7, 13, 14, 15, 16, 25, 26, 27, 28, 35, 36, 37, and values in the data table are represented as 5, 6, 7, 13, 14, 15, 16, 25, 26, 27, 28, 35, 36, 37, 0, 0, 0, 0. In this way, after obtaining these values, the terminal only needs to find numbers of sub-areas in a corresponding table based on a current viewpoint, and may directly request without calculation, according to a correspondence, sub-area bitstreams corresponding to these numbers for decoding presentation, thereby accelerating a processing speed of the terminal.

Based on that the foregoing private file includes a correspondence between a user viewpoint and a number of a sub-area covered by a visual angle of the user viewpoint, in this embodiment of this application, flag data presented for visual angle optimization may be added to the foregoing private file tile_info.dat. Correspondingly, an arrangement of data in the data table viewport_table[][] may occur in an optimized form. That is, a sub-area closer to the current viewpoint indicates that a number of the sub-area appears in a front location of a row corresponding to the current viewpoint.

In this example, the private file further includes information used to represent a quantity of sub-areas that need to be displayed in a sub-area covered by the visual angle of the user, information about a number of the sub-area that needs to be displayed, information about a number of a sub-area that is secondarily displayed, and information about a number of a sub-area that is not displayed. For the private file tile_info.dat, stored content may be in one of the following manners:

(file<tile_info.dat>content)
unsigned int(16) tile_num;
unsigned int(32) pic_width;
unsigned int(32) pic_height;
unsigned int(32) comp_width;
unsigned int(32) comp_height;
unsigned int(32) tile_pic_width[];
unsigned int(32) tile_pic_height[];
unsigned int(32) tile_comp_width[];
unsigned int(32) tile_comp_height[];
unsigned int(16) deg_step_latitude;
unsigned int(16) deg_step_longitude;
unsigned int(32) view_tile_num;
unsigned int(16) priority_view_tile_num;
unsigned int(16) viewport_table[][];

Newly added data is priority_view_tile_num, and a meaning of the data is a quantity of sub-areas that need to be displayed in the current viewpoint. Correspondingly, data arrangement in the table viewport_table[][] is modified, and a sub-area close to the current viewpoint is placed before a row corresponding to the current viewpoint, shown as follows:

```
viewport_table[100][18] = {
  1, 2, 3, 4, 5, 6, 7, 8, 9, 10, 13, 16, 19, 0, 0, 0, 0, 0,
  1, 2, 3, 4, 5, 6, 7, 8, 9, 12, 15, 18, 21, 0, 0, 0, 0, 0,
  ...
  14, 15, 26, 27, 13, 6, 16, 28, 36, 25, 5, 7, 35, 37, 0, 0, 0, 0,
  ...
}
```

As shown in the table, corresponding to the viewpoint located at a visual angle with a latitude of 0° and a longitude of 150° shown in FIG. 9, data in the table is changed to 14, 15, 26, 27, 13, 6, 16, 28, 36, 25, 5, 7, 35, 37, 0, 0, 0, 0, numbers of sub-areas relatively close to the viewpoint, 14, 15, 26, 27 are placed in the front, numbers of sub-areas relatively far away from the viewpoint, 13, 6, 16, 28, 36, 25 are placed in the middle, and numbers of farthest sub-areas 5, 7, 35, 37 are placed behind. A sub-area close to the viewpoint is displayed, and a sub-area relatively far away from the viewpoint is not displayed, and may be secondarily displayed. An advantage of the foregoing operation is that when not all bitstreams of all sub-areas can be obtained or need to be obtained due to some reasons (for example, an instable network), a sub-area close to the viewpoint may be obtained for display, and image data of a sub-area that is not displayed is discarded.

Figure 10:
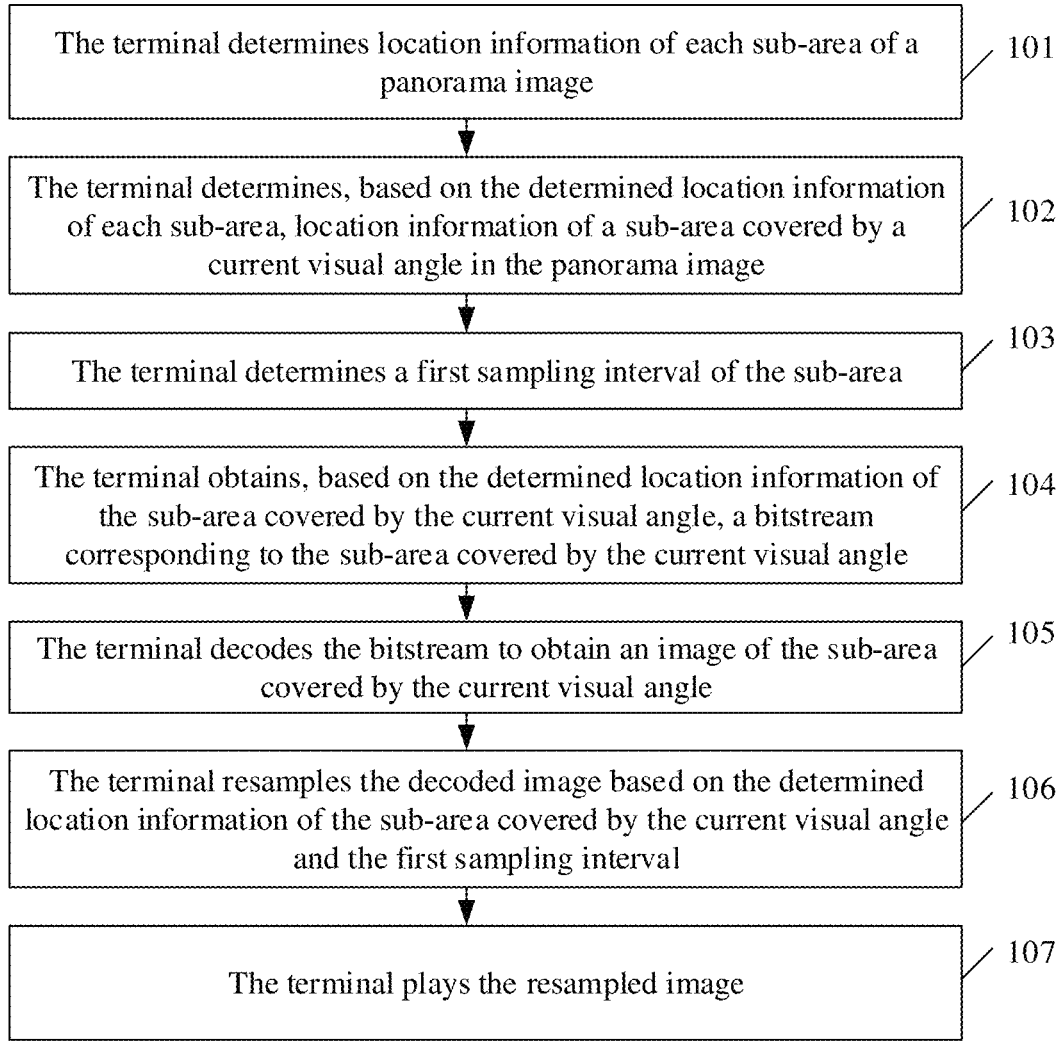
FIG. 10 is a schematic flowchart of an image processing method according to an embodiment of this application.

After the foregoing server performs pre-encoding processing, encoding, and encapsulation, the terminal may obtain an encapsulated bitstream for decoding display. Therefore, as shown in FIG. 10, the method in this embodiment of this application may further include the following steps.

Step 101. The terminal determines location information of each sub-area of a panorama image.

In a possible implementation, the terminal may receive first information sent by the server, where the first information includes a track of each sub-area of the panorama image and a bitstream of each sub-area, and the track includes location information of all sub-areas of the panorama image. The terminal obtains location information of each sub-area in the panorama image through parsing based on the track. The track may be a track of the combined image in the foregoing manner 1, and the terminal may parse location information of all the sub-areas by parsing syntax defined in RectRegionPacking(i) in the track of the combined image.

Alternatively, for the location information of the sub-area, the terminal may store, according to the foregoing manner 2 in which the location information of the sub-area is stored, location information of each sub-area in a track corresponding to each sub-area, namely, tile track. The terminal may obtain location information of the current sub-area by parsing an area defined in SubPictureCompositionBox in each tile track.

Alternatively, the terminal may receive an MPD sent by the server, where the MPD includes the location information of each sub-area, or the MPD includes an address of a private file, and the private file includes the location information of each sub-area. The terminal parses the MPD to obtain the location information of each sub-area.

Alternatively, the terminal may first obtain a bitstream corresponding to each sub-area, and the location information of the sub-area exists in an SEI corresponding to the sub-area. That is, when requesting a required bitstream of the sub-area, the terminal may obtain the location information of the sub-area based on the SEI in the bitstream.

Step 102. The terminal determines, based on the determined location information of each sub-area, location information of a sub-area covered by a current visual angle in the panorama image.

For example, the terminal may obtain the location information of the sub-area covered by the current visual angle in the panorama image according to a matching relationship between a visual angle and the location information of the sub-area covered by the visual angle.

Step 103. The terminal determines a first sampling interval of the sub-area.

The terminal may determine a preset sampling interval as the first sampling interval, or the terminal receives the first sampling interval from the server, or the terminal may obtain the first sampling interval based on location information of each sub-area that is received from the server. That is, a preset calculation rule may exist between the location information of each sub-area and the first sampling interval in order to obtain a first sampling interval corresponding to each sub-area. The calculation rule may be a ratio of a size in the location information of the sub-area in the source image to a size in the location information of the sub-area in the combined image, namely, the first sampling interval.

Step 104. The terminal obtains, based on the determined location information of the sub-area covered by the current visual angle, a bitstream corresponding to the sub-area covered by the current visual angle.

If bitstreams of all the sub-areas are stored locally in the terminal, the terminal may directly obtain, from a memory of the terminal, a bitstream of a sub-area covered by the current visual angle.

Alternatively, the terminal requests, from the server, to obtain the bitstream corresponding to the sub-area covered by the current visual angle. For example, the terminal may send information indicating the current visual angle to the server. The server may obtain, based on the current visual angle and location information of a sub-area that can be covered by the current visual angle, the sub-area covered by the current visual angle, and then send the bitstream that is corresponding to the sub-area covered by the current visual angle and that is required by the terminal to the terminal. For example, the server may send, to the terminal, a bitstream obtained after to-be-transmitted sub-area bitstreams are combined. Alternatively, after obtaining, based on the current visual angle and the location information of the sub-area covered by the current visual angle, the sub-area covered by the current visual angle, the terminal may send a number of the sub-area covered by the current visual angle to the server, and the server may send, based on the number, a bitstream of the sub-area required by the terminal to the terminal. Alternatively, the terminal may obtain, from the server according to a protocol preset by the terminal and the server, the bitstream corresponding to the sub-area covered by the current visual angle, where the protocol includes a correspondence between a visual angle and a sub-area covered by the visual angle. A manner in which the terminal obtains the required bitstream is not limited in this application.

Step 105. The terminal decodes the bitstream to obtain an image of the sub-area covered by the current visual angle.

Because the server performs horizontal division, vertical division, and vertical downsampling processing on the longitude-latitude map, namely, performs de-redundancy processing on a pixel in the sub-area such that pixel redundancy of a to-be-transmitted sub-area is reduced and a pixel value is reduced. For a decoder, when a bitstream of a sub-area covered by a current visual angle is obtained, a requirement for the decoding capability may be reduced and complexity of decoding is reduced, thereby improving a decoding speed.

Step 106. The terminal resamples the decoded image based on the determined location information of the sub-area covered by the current visual angle and the first sampling interval.

Step 107. The terminal plays the resampled image.

As shown in FIGS. 11A-11D, it is assumed that a sub-area corresponding to a visual angle that the user requests to display is shown in FIG. 11D. Based on a required sub-area obtained through calculation as shown in FIG. 11B, the terminal may obtain, based on a correspondence between a number of the sub-area and a bitstream, a bitstream corresponding to the required sub-area, including sub-bitstreams numbered 1, 3, 4, 5, 6, 15, 19, 20, 21, 22, 23, 24, 34, 35, 36, and 37 as shown in FIG. 11C. Further, after decoding the sub-bitstreams, the terminal may resample the decoded image based on the location information and the first sampling interval, and play the resampled image as shown in FIG. 11D.

Figure 12:
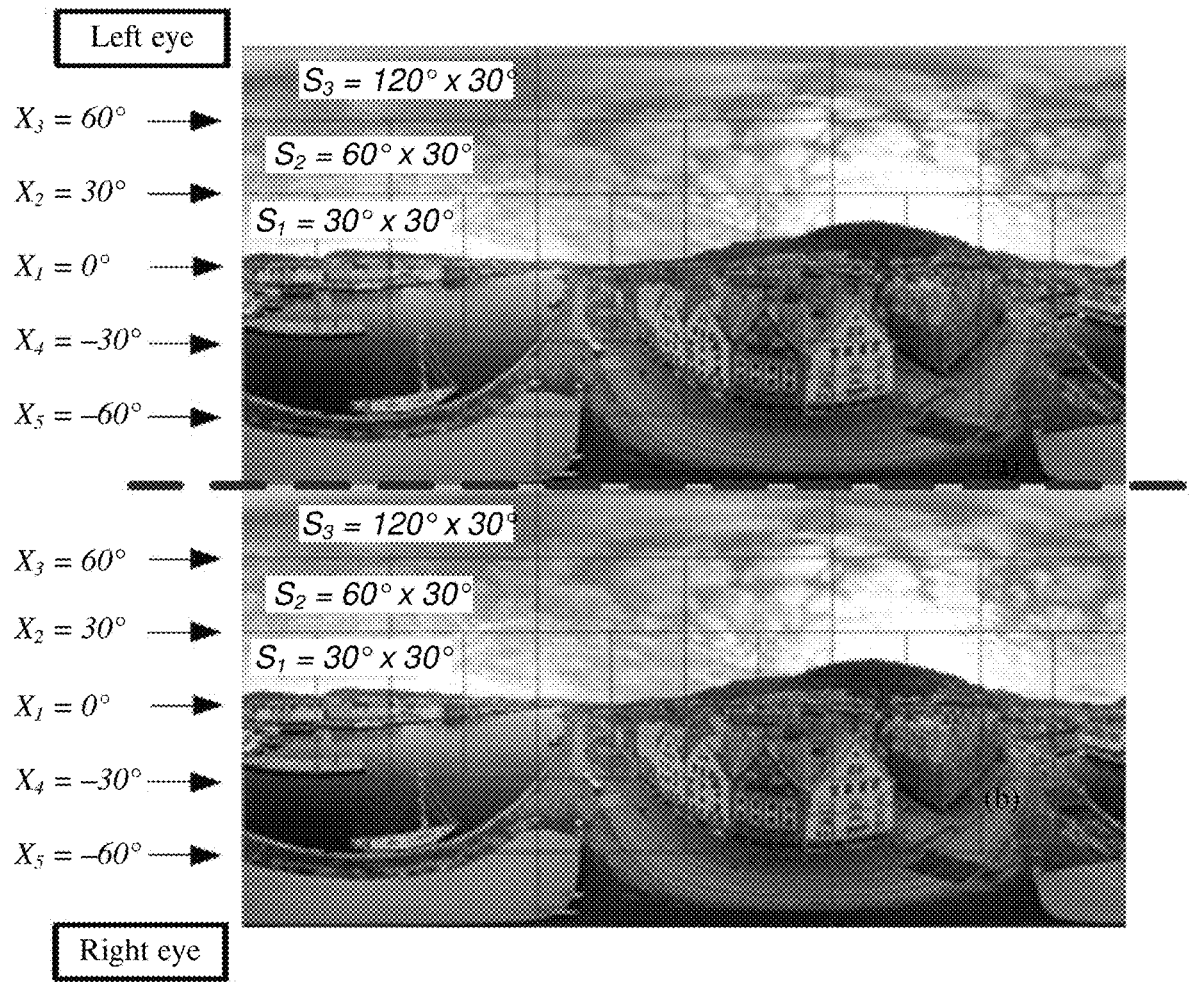
FIG. 12 is a schematic diagram of sub-area division of a 3D longitude-latitude map according to an embodiment of this application.

The foregoing pre-encoding processing, encoding, and terminal part are described using an example in which a 2D longitude-latitude map is used. This embodiment of this application may be further used for an encoding and transmission process of a 3D longitude-latitude map, and two channels of signals of a sequence of the 3D longitude-latitude map may be separately processed. It may be understood that, when a 3D visual effect needs to be presented, a photographing device that communicates with the server may include two groups, one group of photographing devices is configured to obtain a panorama video of a left eye, and the other group of photographing devices is configured to obtain a panorama video of a right eye. In this way, sub-area division of the 3D longitude-latitude map may be shown in FIG. 12. The longitude-latitude map of the left eye is the upper half of FIG. 12, and the longitude-latitude map of the right eye is the lower half of FIG. 12. The longitude-latitude map corresponding to the left eye may be spliced with the longitude-latitude map corresponding to the right eye, to be one longitude-latitude map, or may be separated from each other, to be two longitude-latitude maps. The server may separate the longitude-latitude map corresponding to the left eye from the longitude-latitude map corresponding to the right eye in order to perform horizontal division and vertical division on the longitude-latitude map corresponding to the left eye, and perform horizontal division and vertical division on the longitude-latitude map corresponding to the right eye.

In the 3D longitude-latitude map, for the horizontal division of the left-eye longitude-latitude map, refer to an implementation of step 401, for the horizontal division of the right-eye longitude-latitude map, also refer to the implementation of step 401. Details are not described herein again.

In the 3D longitude-latitude map, for the vertical division of the left-eye longitude-latitude map, refer to an implementation of step 402, for the vertical division of the right-eye longitude-latitude map, also refer to the implementation of step 402. Details are not described herein again.

In the 3D longitude-latitude map, for sampling of each sub-area of the left-eye longitude-latitude map, refer to implementations of step 404 and step 405, for sampling of each sub-area of the right-eye longitude-latitude map, also refer to implementations of step 404 and step 405. Details are not described herein again.

Therefore, 42 sub-areas are finally obtained in the left-eye longitude-latitude map, and 42 sub-areas are obtained in the right-eye longitude-latitude map, and a total of 84 sub-areas are obtained.

In the 3D longitude-latitude map, there may be a plurality of manners for encoding each sub-area in an image obtained after division and sampling, and three possible manners are listed herein. In a first manner, each sub-area is used as one sub-picture, divided from an original image, and each sub-picture sequence is independently encoded to generate 84 sub-bitstreams. In a second manner, divided sub-area mode encoding (supported by an HEVC standard) is performed on an entire image to generate a single bitstream for storage, or the single bitstream is divided to obtain 84 sub-bitstreams for storage. In a third manner, sub-areas in a same location of the left-eye longitude-latitude map and the right-eye longitude-latitude map are used as one group of sub-areas, and after image splicing is performed, the left-eye longitude-latitude map and the right-eye longitude-latitude map are separately encoded to generate 42 sub-bitstreams.

For an encapsulation process, refer to the foregoing manner 1 to manner 5. Details are not described herein again.

For a 3D longitude-latitude map video, a difference between a process in which the terminal decodes video content and that in the 2D longitude-latitude map is that location information of the sub-area covered by the current visual angle herein includes location information of a left-eye image sub-area and location information of a right-eye image sub-area.

Bitstreams of the sub-area covered by the current visual angle include bitstreams of sub-areas in the left-eye longitude-latitude map and bitstreams of sub-areas in the right-eye longitude-latitude map. A value of the current visual angle may be a viewpoint value of the left eye or a viewpoint value of the right eye. This is not limited herein. During resampling, an image of a sub-area covered by a left eye in a current visual angle is resampled, and an image of a sub-area covered by a right eye in the current visual angle is resampled, and a required left eye sub-area and a required right eye sub-area are rendered and displayed.

The foregoing method process may further be applied to a longitude-latitude map of a 360-degree panorama video image, or a part of the longitude-latitude map of the 360-degree panorama video image. For example, a division manner of the longitude-latitude map may further be applied to division of a longitude-latitude map of a 180° half-panorama video image. The 180° half-panorama video is a panorama video whose longitude range is 180° and contains half of the content of the 360-degree panorama video.

Figure 13A:
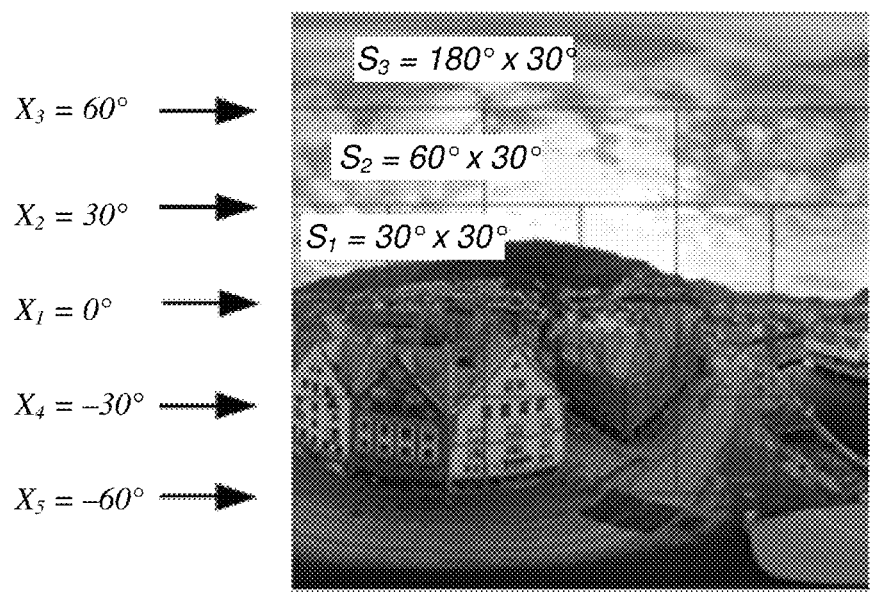
FIG. 13A and 13B are a schematic diagram of a horizontal division manner of a 180° half-panorama video longitude-latitude map according to an embodiment of this application.

As shown in FIG. 13A, for a horizontal division manner of the longitude-latitude map of the 180° half-panorama video, refer to the foregoing step 401. For vertical division, different from a possible implementation of the foregoing step 402, a sub-picture in a latitude range from −90° to −60° and a sub-picture in a latitude range from 60° to 90° may not be vertically divided, to retain a single sub-area, for a sub-picture in a latitude range from −60° to −30° and a sub-picture in a latitude range from 30° to 60°, the sub-picture is vertically divided using a longitude of 60° as a vertical division interval, to obtain three sub-areas, and for a sub-picture in a latitude range from −30° to 0° and a sub-picture in a latitude range from 0° to 30°, the sub-picture is vertically divided using a longitude of 30° as a vertical division interval to obtain six sub-areas. In this way, sub-area division of the longitude-latitude map of the entire 180° half-panorama video is completed, and a total of 20 sub-areas are obtained.

Figure 13B:
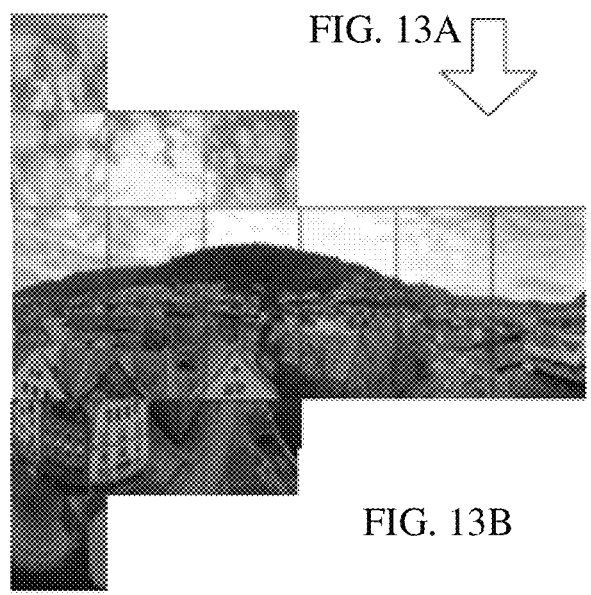

A sub-area of the longitude-latitude map of the 180° half-panorama video may also be downsampled and encoded, which may be the same as that in the foregoing implementation of step 404. A difference from the foregoing implementation of step 405 may be as follows. FIG. 13A is used as an example, and for a sub-picture in a latitude range from −90° to −60° and in a latitude range from 60° to 90°, downsampling is performed in a horizontal direction instead of a vertical direction, and a scaling coefficient is ⅙, for a sub-picture in a latitude range from −60° to −30° and in a latitude range from 30° to 60°, similarly, downsampling is performed in a horizontal direction instead of a vertical direction, and a scaling coefficient is ½, for a sub-picture in a latitude range from −30° to 0° and in a latitude range from 0° to 30°, no scaling is performed. A finally obtained scaled image is shown in FIG. 13B.

Figure 14:
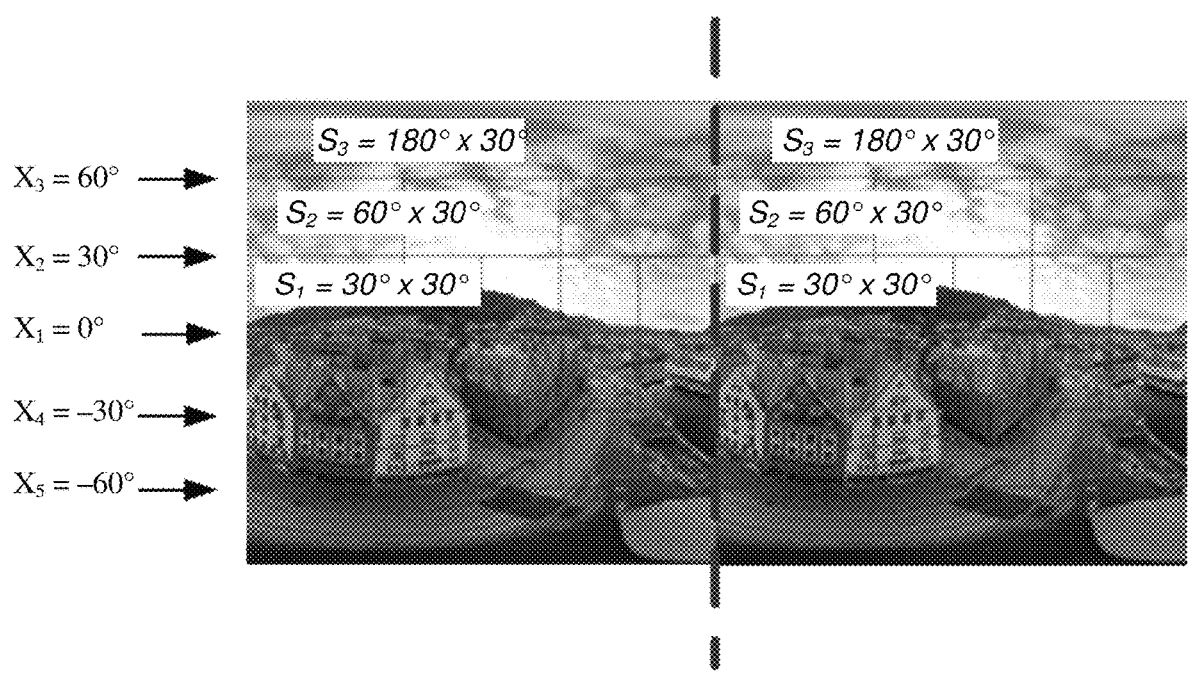
FIG. 14 is a schematic diagram of a sub-area division manner of a 3D 180° half-panorama video longitude-latitude map according to an embodiment of this application.

The foregoing sub-area division manner of the longitude-latitude map of the 180° half-panorama video may also be applied to sub-area division of a longitude-latitude map of a 3D 180° half-panorama video. Similar to that of the 360° panorama video, the longitude-latitude map of the 3D 180° half-panorama video also includes a longitude-latitude map of the 180° half-panorama video of a left eye and a longitude-latitude map of the 180° half-panorama video of a right eye. The longitude-latitude map of the left eye and the longitude-latitude map of the right eye may be spliced together. As shown in FIG. 14, the longitude-latitude map of the left eye is a left half part of FIG. 14, and the longitude-latitude map of the right eye is a right half part of FIG. 14. The server may first separate the longitude-latitude map of the left eye from the longitude-latitude map of the right eye, as shown by a dashed line in FIG. 14. Then the longitude-latitude map of the left eye is divided according to the division manner of the longitude-latitude map of the 180° half-panorama video, and the longitude-latitude map of the right eye is also divided according to the division manner of the longitude-latitude map of the 180° half-panorama video to finally obtain 20 sub-areas corresponding to the longitude-latitude map of the left eye, and 20 sub-areas corresponding to the longitude-latitude map of the right eye, in total of 40 sub-areas.

In the foregoing process, the server may obtain, based on a video signal photographed by the photographing device, a longitude-latitude map corresponding to a panorama video or a half-panorama video. In this embodiment of this application, the server may further provide a method for directly dividing a spherical panorama signal to obtain image sub-areas. Because a source image is a spherical signal map, or is referred to as a sphere map, a bitstream encapsulation manner and a sub-area division manner are also change. In this embodiment, a signal location in a spherical area is specified using a latitude and a longitude, where a specified longitude range is 0 to 360°, and a latitude range is −90° to 90° (a negative number represents a south latitude, and a positive number represents a north latitude).

Figure 15:
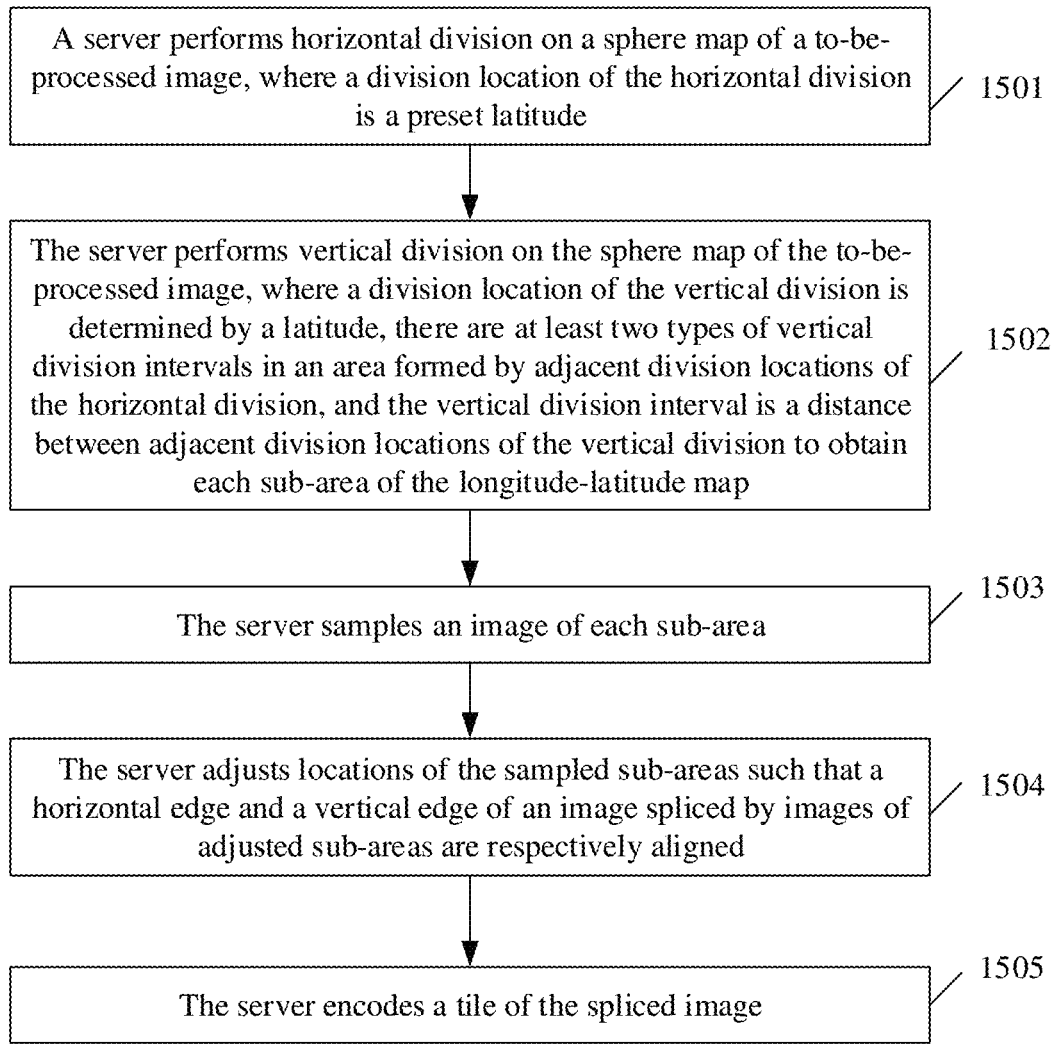
FIG. 15 is a schematic flowchart of an image processing method according to an embodiment of this application.

Therefore, the embodiments of this application provide an image processing method. As shown in FIG. 15, the method includes the following steps.

Step 1501. A server performs horizontal division on a sphere map of a to-be-processed image, where a division location of the horizontal division is a preset latitude.

Figure 16A:
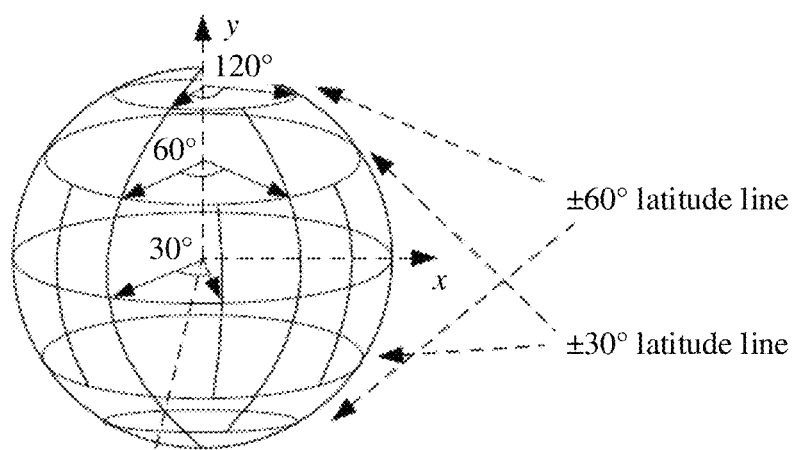
FIG. 16A, FIG. 16B and FIG. 16C are a schematic diagram of a method for dividing a sphere panorama signal to obtain image sub-areas according to an embodiment of this application.

For example, the server may separately draw lines of latitude at a latitude −60°, a latitude −30°, a latitude 0°, a latitude 30°, and a latitude 60° in a spherical surface, to horizontally divide the sphere map, as shown in FIG. 16A.

Step 1502. The server performs vertical division on the sphere map of the to-be-processed image, where a division location of the vertical division is determined by a latitude, there are at least two types of vertical division intervals in an area formed by adjacent division locations of the horizontal division, and the vertical division interval is a distance between adjacent division locations of the vertical division to obtain each sub-area of the longitude-latitude map.

For example, in the sphere map, for a spherical area in a latitude range from −90° to −60° and in a latitude range from 60° to 90°, a longitude of 120° may be used as a vertical division interval to vertically divide the sphere map to obtain three spherical sub-areas, for a spherical area in a latitude range from −60° to −30° and in a latitude range from 30° to 60°, a longitude of 60° is used as a vertical division interval to vertically divide the sphere map to obtain six spherical sub-areas, for a spherical area in a latitude range from −30° to 0° and in a latitude range from 0° to 30°, a longitude of 30° is used as a vertical division interval to vertically divide the sphere map to obtain 12 spherical sub-areas. In this way, a total of 42 sub-areas are obtained after sub-area division of the entire sphere map is completed, as shown in FIG. 16A.

Step 1503. The server samples an image of each sub-area.

The server may first map the image of the sub-area to a 2D planar image based on a preset size in order to sample each sub-area of the longitude-latitude map at a first sampling interval and a second sampling interval.

An implementation in which a 3D sphere map is mapped to a 2D longitude-latitude map may be evenly sampling, at a preset height in a vertical direction, an image of a sub-area obtained after the sphere map is divided, and evenly sampling the image of the sub-area at a preset width in a horizontal direction. Then the image of each sub-area obtained after even sampling is performed may be sampled in a horizontal direction at the first sampling interval, and the image of the sub-area is sampled in a vertical direction at the second sampling interval.

Figure 16B:
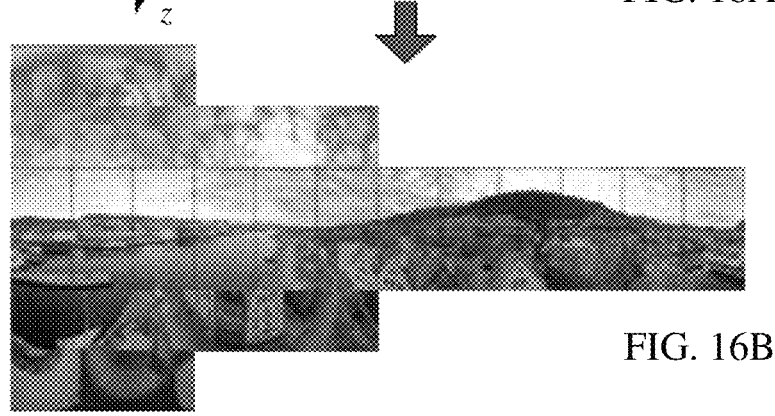

For example, image signal mapping is performed on all sub-areas in FIG. 16A that are corresponding to sub-areas on the sphere map such that each sub-area on the sphere map corresponds to a mapped image, namely, a sub-area in a 2D longitude-latitude map, and downsampling is performed on the longitude-latitude map. There are many methods for mapping a spherical signal to an image of a sub-area, and this is not limited herein. One manner may be as follows. For each spherical sub-area in a latitude direction, the spherical signal is evenly mapped based on a preset height of an image in the sub-area in FIG. 16B, and evenly mapping may be understood as evenly sampling. In a longitude direction, for a sub-spherical area in a latitude range from −90° to −60° and in a latitude range from 60° to 90°, the spherical signal is mapped after being downsampled in ¼ of a sampling rate in a latitude direction, namely, a scaling coefficient is ¼, for a sub-spherical area in a latitude range from −60° to −30° and in a latitude range from 30° to 60°, the spherical signal is mapped after being downsampled in ½ of the sampling rate in the latitude direction, namely, the scaling coefficient is ½, for a sub-spherical area in a latitude range from −30° to 0° and in a latitude range from 0° to 30°, a spherical signal is mapped in a same sampling rate in the latitude direction, namely, the scaling coefficient is 1. A finally obtained sampled image of the longitude-latitude map is shown in FIG. 16B.

Figure 16C:
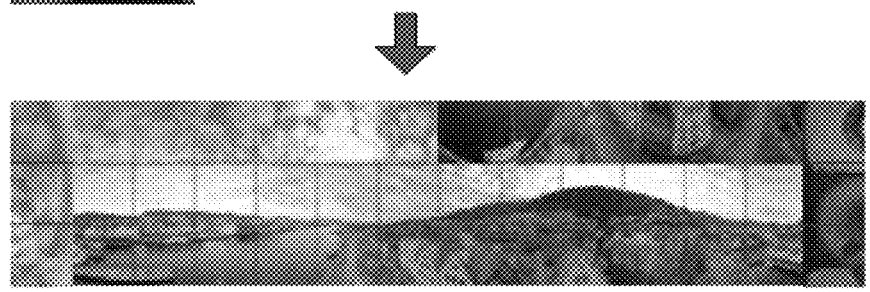

Step 1504. The server adjusts locations of the sampled sub-areas such that a horizontal edge and a vertical edge of an image spliced by images of adjusted sub-areas are respectively aligned, as shown in FIG. 16C. Step 1504 may not be performed.

Step 1505. The server encodes a tile of the spliced image.

For an implementation of step 1505, refer to step 407. Details are not described herein again.

In an image processing method for the sphere map, an encapsulation manner for a bitstream of each sub-area may be the same as that in the foregoing step 408, and various storage manners for location information of a sub-area may also be the same as that in step 408. Differently, when a sub-area is obtained by performing horizontal division and vertical division on a sphere map of a to-be-processed image, the sampled sub-areas form a sampled sphere map. The location information includes a location and a latitude-longitude range of the sub-area in an image of the sphere map, and a location and a size of the sub-area in an image of the sampled sphere map, or the location information includes a location and a latitude-longitude range of the sub-area in the image of the sphere map, and a location and a size of the sub-area in the spliced image. Variable semantic modification performed on the foregoing sub-area division manner description is as follows.

The following semantics are modified in manner 1.

proj_reg_width[i] and proj_reg_height[i] describe a corresponding latitude-longitude range of an i$^{th}$ sub-area in a source image, namely, the sphere map, namely, a corresponding latitude-longitude range of a sub-area that is in FIG. 16B and in FIG. 16A. For example, a latitude-longitude range of a first sub-area in the upper left corner of FIG. 16B is (120°, 30°) in the source image.

proj_reg_top[i] and proj_reg_left[i] describe a corresponding location of a pixel that is in the left upper corner of the i$^{th}$ sub-area in the sphere map. Represented by a longitude and a latitude, the location is a corresponding location of a left upper point of the sub-area that is in FIG. 16B and in FIG. 16A. For example, a location of the first sub-area is (0°, 90°) in the sphere map.

The following semantics are modified in manner 2.

proj_tile_width and proj_tile_height describe a latitude-longitude range of a current track in the sphere map, namely, a latitude-longitude range of a current sub-area in FIG. 16A.

proj_width and proj_height describe a latitude-longitude range of a sphere map. For example, a latitude-longitude range of a 360° panorama sphere is (360°, 180°).

For content of the private file tile_info.dat in manner 4, semantics are modified as follows.

pic_width represents a longitude range of the sphere map.
pic_height represents a latitude range of the sphere map.
tile_pic_width[] is an array representing a longitude range of each sub-area in the sphere map, and a quantity of elements should be a tile_num value.
tile_pic_height[] is an array representing a latitude range of each sub-area in the sphere map, and a quantity of elements should be a tile_num value.

The following semantics are modified in manner 5.

src_pic_width represents a longitude range of the sphere map, namely, a longitude range of the sphere map in FIG. 16A.

src_pic_height represents a latitude range of the sphere map, namely, a latitude range of the sphere map in FIG. 16A.

src_tile_width represents a longitude range of the current sub-area on the sphere map.

src_tile_height represents a latitude range of the current sub-area on the sphere map.

In this way, in comparison with the even division manner of the longitude-latitude map in this application, in this uneven division manner and the image scaling manner, image redundancy is reduced such that tile-wise encoding and transmission efficiency can be greatly improved. In addition, a maximum decoding capability required by a terminal decoder is also reduced such that a source image with a higher-resolution is possible to be encoded and transmitted for display in an existing decoding capability. Even division of 6×3 is used as an example, a proportion of pixels that need to be transmitted is up to 55.6%. If a resolution of the source image is 4K (4096×2048), a decoding capability of the decoder needs to reach about 4K×1K. However, in the method in this application, a proportion of transmitted pixels is up to 25%. If the resolution of the source image is 4K (4096×2048), the decoding capability of the decoder needs to reach 2K×1K. In addition, the performance improves a decoding speed and a playing speed. In the solution of this application, decoding and playing processing efficiency is higher than that in an even division solution.

An embodiment of this application further provides an image processing method, where the method is applied to a server, as shown in FIG. 17A, and includes the following steps.

Step 17A1. The server stores bitstreams corresponding to images of sub-areas of a longitude-latitude map or a sphere map of a panorama image, where the sub-area is obtained by performing horizontal division and vertical division on the longitude-latitude map or the sphere map of the panorama image, where a division location of the horizontal division is a preset latitude, a division location of the vertical division is determined by a latitude, there are at least two types of vertical division intervals in an area formed by adjacent division locations of the horizontal division, and the vertical division interval is a distance between adjacent division locations of the vertical division.

Step 17A2. The server sends, to a terminal, a bitstream of a sub-area covered by a current visual angle in the stored bitstreams that are corresponding to the images of the sub-areas and that are required by the terminal.

Before being encoded, the image that is corresponding to the sub-area and that is stored in the server is sampled in a horizontal direction at a first sampling interval, where a higher latitude corresponding to the sub-area indicates a larger first sampling interval, or the image is sampled in a vertical direction at a second sampling interval. For a specific implementation of sampling, refer to the description in the foregoing embodiment.

That is, the server in this embodiment may store a bitstream corresponding to an image that is of each sub-area and that is processed by the server in the foregoing embodiment. Because a sub-area division manner and a sampling process that are used by the server in the foregoing embodiment to process an image may reduce occupied bandwidth during bitstream transmission, a requirement of a decoding end for a decoding capability is reduced, decoding complexity is reduced, and a decoding speed is improved. In this embodiment, bandwidth occupied by the server during bitstream transmission is reduced compared with that in the other approaches, and a decoding speed of the terminal is improved.

The foregoing mainly describes the solutions provided in the embodiments of this application from a perspective of interaction between network elements. It may be understood that, to implement the foregoing functions, each of network elements, such as the server and the terminal, includes a corresponding hardware structure and/or software module for performing each function. A person skilled in the art should easily be aware that, in combination with the examples described in the embodiments disclosed in this specification, units, and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the server and the terminal may be divided into function modules based on the foregoing method examples. For example, each function module may be obtained through division for a corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

When functional modules are divided based on corresponding functions, FIG. 17B shows a possible schematic structural diagram of a server 17 in the foregoing embodiment. The server 17 includes a dividing unit 1701, an encoding unit 1702, a sampling unit 1703, a splicing unit 1704, an encapsulation unit 1705, and a transmission unit 1706. The dividing unit 1701 may be configured to support the server to perform step 401 and step 402 in FIG. 4, and the encoding unit 1702 may be configured to support the server to perform step 403 in FIG. 4 and step 407 in FIG. 7. The sampling unit 1703 may be configured to support the server to perform step 404 and step 405 in FIG. 7, the splicing unit 1704 is configured to support the server to perform step 406 in FIG. 7, and the encapsulation unit 1705 may be configured to support the server to perform step 408 in FIG. 7. All content related to the steps in the foregoing method embodiments may be cited in function descriptions of corresponding function modules. Details are not described herein.

Figure 18:
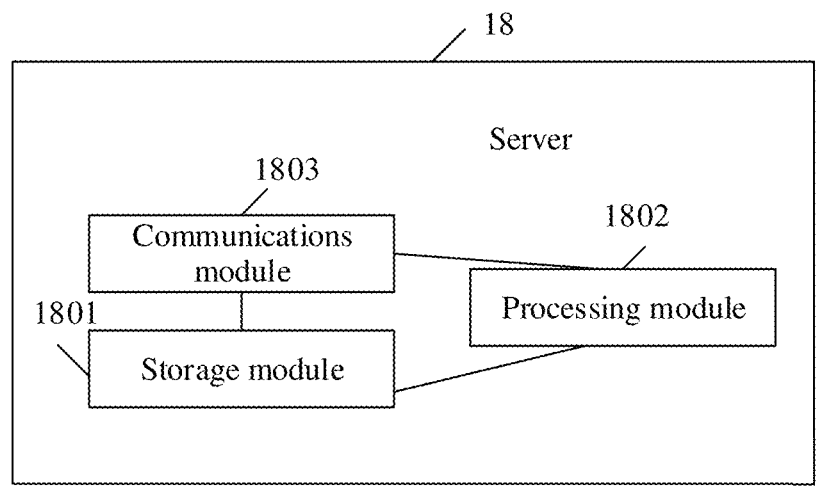
FIG. 18 is a schematic structural diagram of a server according to an embodiment of this application.

When an integrated unit is used, FIG. 18 is a possible schematic structural diagram of a server 18 in the foregoing embodiment. The server 18 includes a processing module 1802 and a communications module 1803. The processing module 1802 is configured to control and manage an action of the server. For example, the processing module 1802 is configured to perform step 401, step 402, step 403, step 404, step 405, step 406, step 407, and step 408 in FIG. 4 and/or another process of the technology described in this specification. The communications module 1803 is configured to support communication between the server and another network entity, for example, communication between the server and the terminal. The server may further include a storage module 1801 configured to store program code and data of the server.

The processing module 1802 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 1803 may be a transceiver, a transceiver circuit, a communications interface, or the like. The storage module 1801 may be a memory.

Figure 19:
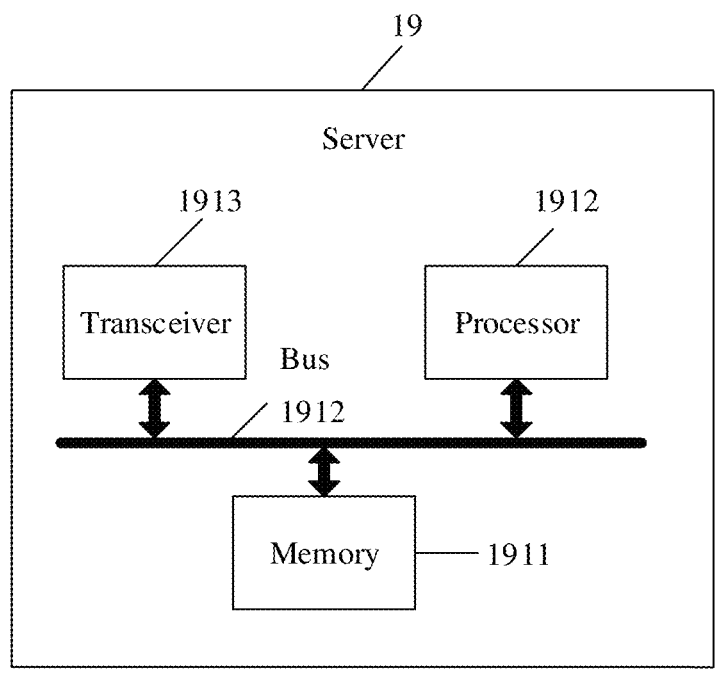
FIG. 19 is a schematic structural diagram of a server according to an embodiment of this application.

When the processing module 1802 is a processor, the communications module 1803 is a transceiver, and when the storage module 1801 is a memory, the server in this embodiment of this application may be a server 19 shown in FIG. 19.

As shown in FIG. 19, the server 19 includes a processor 1912, a transceiver 1913, a memory 1911, and a bus 1914. The transceiver 1913, the processor 1912, and the memory 1911 are connected to each other through the bus 1914. The bus 1914 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

Figure 20:
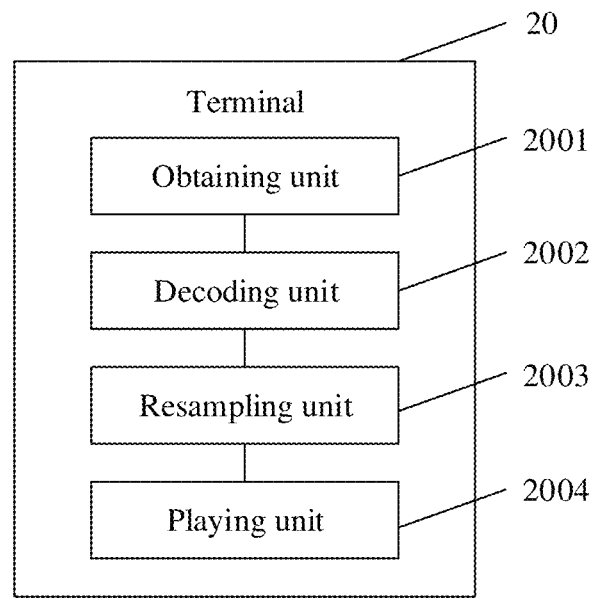
FIG. 20 is a schematic structural diagram of a terminal according to an embodiment of this application.

When functional modules are divided based on corresponding functions, FIG. 20 shows a possible schematic structural diagram of a terminal 20 in the foregoing embodiment. The terminal 20 includes an obtaining unit 2001, a decoding unit 2002, a resampling unit 2003, and a playing unit 2004. The obtaining unit 2001 is configured to support the terminal to perform step 101, step 102, step 103, and step 104 in FIG. 10. The decoding unit 2002 is configured to support the terminal to perform step 105 in FIG. 10. The resampling unit 2003 is configured to support the terminal to perform step 106 in FIG. 10. The playing unit 2004 is configured to support the terminal to perform step 107 in FIG. 10. All content related to the steps in the foregoing method embodiments may be cited in function descriptions of corresponding function modules. Details are not described herein.

Figure 21:
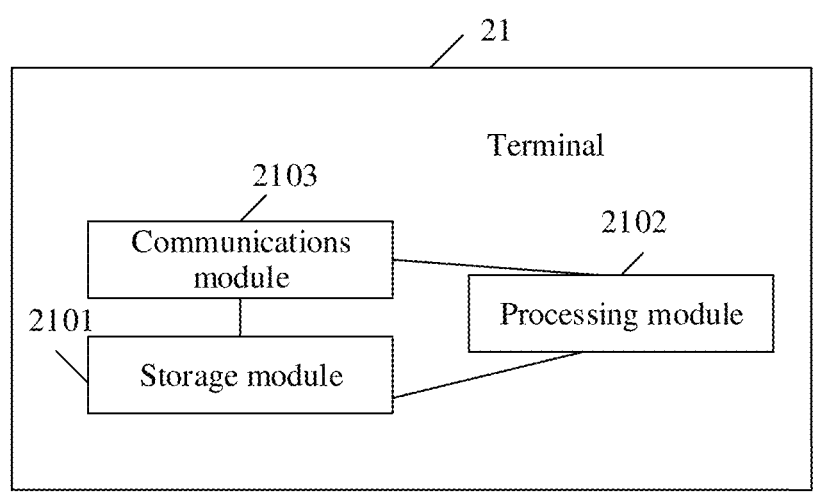
FIG. 21 is a schematic structural diagram of a terminal according to an embodiment of this application.

When an integrated unit is used, FIG. 21 is a possible schematic structural diagram of a terminal 21 in the foregoing embodiment. A terminal 21 includes a processing module 2102 and a communications module 2103. The processing module 2102 is configured to control and manage an action of the terminal. For example, the processing module 2102 is configured to support the terminal to perform step 101 to step 106 in FIG. 10, and/or is configured to perform another process of the technology described in this specification. The communications module 2103 is configured to support communication between the terminal and another network entity, for example, communication between the terminal and the server. The terminal may further include a storage module 2101 configured to store program code and data of the terminal, and further include a display module (not shown) configured to support the terminal to perform step 107 in FIG. 10.

The processing module 2102 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2103 may be a transceiver, a transceiver circuit, a communications interface, or the like. The storage module 2101 may be a memory. The display module may be a display or the like.

Figure 22:
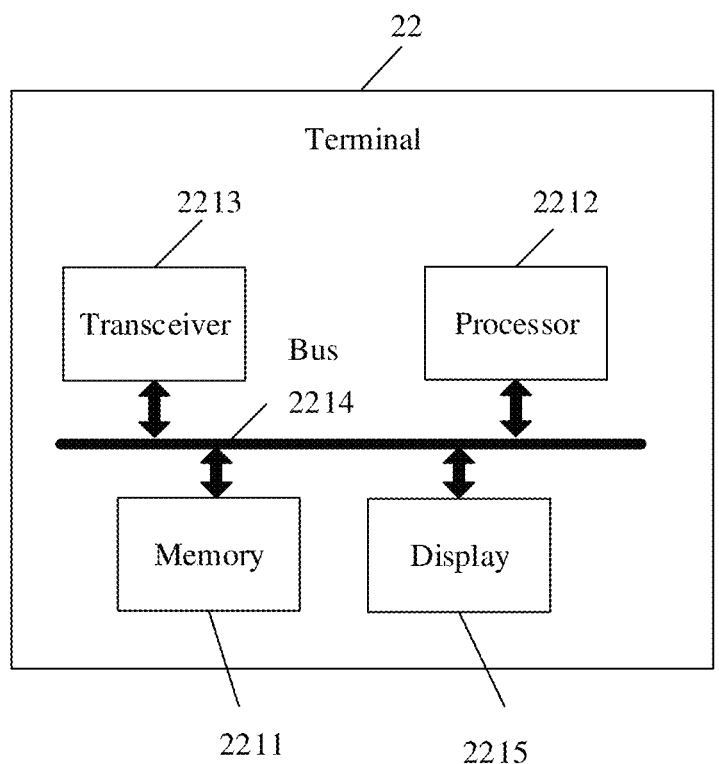
FIG. 22 is a schematic structural diagram of a terminal according to an embodiment of this application.

When the processing module 2102 is a processor, the communications module 2103 is a transceiver, the storage module 2101 is a memory, and the display module is a display, the terminal 21 in this embodiment of this application may be a terminal 22 shown in FIG. 22.

As shown in FIG. 22, the terminal 22 includes a processor 2212, a transceiver 2213, a memory 2211, a display 2215, and a bus 2214. The transceiver 2213, the processor 2212, the display 2215, and the memory 2211 are interconnected through the bus 2214. The bus 2214 may be a PCI bus, an EISA bus, or the like. The bus 2214 may be classified into an address bus, a data bus, a control bus, and the like. For ease of representation, only one thick line is used to represent the bus 2214 in FIG. 22, but this does not mean that there is only one bus or only one type of bus.

Figure 23:
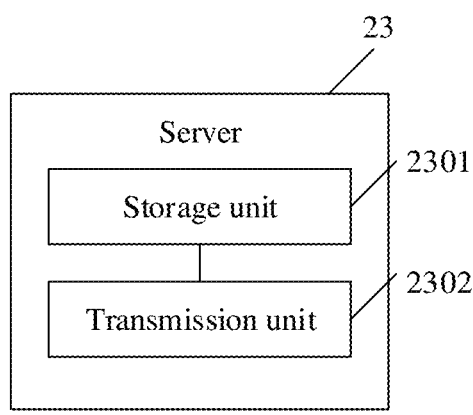
FIG. 23 is a schematic structural diagram of a server according to an embodiment of this application.

When functional modules are divided based on corresponding functions, FIG. 23 shows a possible schematic structural diagram of a server 23 in the foregoing embodiment. The server 23 includes a storage unit 2301, a transmission unit 2302, where the storage unit 2301 is configured to support the server to perform step 17A1 in FIG. 17A, and the transmission unit 2302 is configured to support the server to perform step 17A2 in FIG. 17A. All content related to the steps in the foregoing method embodiments may be cited in function descriptions of corresponding function modules. Details are not described herein.

Figure 24:
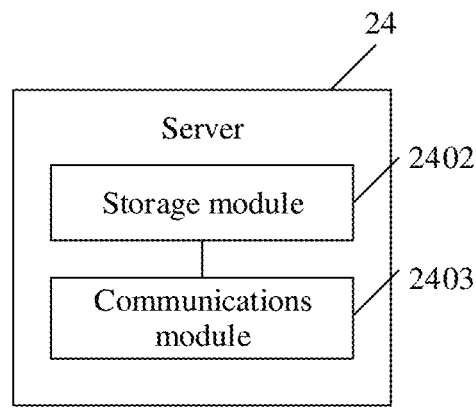
FIG. 24 is a schematic structural diagram of a server according to an embodiment of this application.

When an integrated unit is used, FIG. 24 is a possible schematic structural diagram of a server 24 in the foregoing embodiment. The server 24 includes a storage module 2402 and a communications module 2403. The storage module 2402 is configured to store program code and data of the server 24. For example, the program is configured to perform step 17A1 in FIG. 17A, and the communications module 2403 is configured to perform step 17A2 in FIG. 17A.

Figure 25:
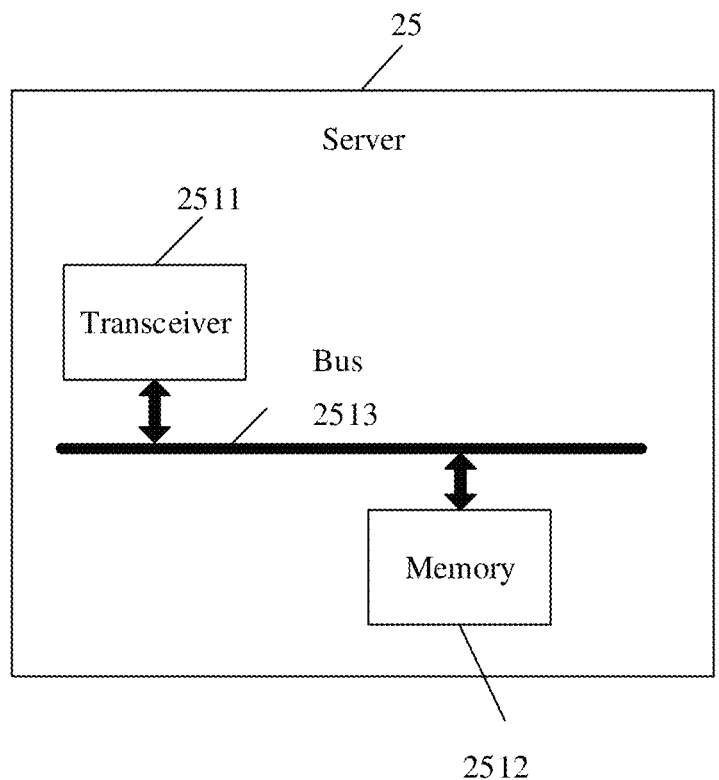
FIG. 25 is a schematic structural diagram of a server according to an embodiment of this application.

When the communications module 2403 is a transceiver, and the storage module (not shown) is a memory, the server in this embodiment of this application may be the server 25 shown in FIG. 25.

As shown in FIG. 25, the server 25 includes a transceiver 2511, a memory 2512, and a bus 2513. The transceiver 2511 and the memory 2512 are interconnected through the bus 2513. The bus 2513 may be a PCI bus, an EISA bus, or the like. The bus 2513 may be classified into an address bus, a data bus, a control bus, and the like. For ease of representation, only one thick line is used to represent the bus 2513 in FIG. 25, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read only memory (ROM), an erasable programmable ROM (EPROM), an electrically EPROM (EEPROM), a register, a hard disk, a mobile hard disk, a compact disc ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. An image processing method implemented by a server, the image processing method comprising:
   determining a division location of vertical division using a latitude;
   performing horizontal division and the vertical division on a longitude-latitude map or a sphere map of a to-be-processed image to obtain sub-areas of the longitude-latitude map or the sphere map, wherein a division location of the horizontal division is a preset latitude, wherein at least two types of vertical division intervals in an area are formed by adjacent division locations of the horizontal division, and wherein a vertical division interval is a distance between adjacent division locations of the vertical division;
   sampling an image of a sub-area in a horizontal direction at a first sampling interval, wherein a higher latitude corresponding to the sub-area indicates a larger first sampling interval;
   encoding, sampled images of sampled sub-areas; and
   encoding images of the sub-areas after sampling the image of the sub-area in the horizontal direction at the first sampling interval and after encoding the sampled images of the sampled sub-areas.

2. The image processing method of claim 1, wherein a higher latitude of a division location of the vertical division indicates a larger vertical division interval.

3. The image processing method of claim 1, wherein before encoding the images of the sub-areas, the image processing method further comprises sampling the image of the sub-area in a vertical direction at a second sampling interval.

4. The image processing method of claim 1, further comprising:
   obtaining the sub-area by performing horizontal division and vertical division on the sphere map of the to-be-processed image;
   mapping the image of the sub-area to a two-dimensional planar image based on a preset size before sampling the image of the sub-area in the horizontal direction at the first sampling interval; and
   sampling, at the first sampling interval in the horizontal direction, the two-dimensional planar image.

5. The image processing method of claim 1, wherein before encoding the images of the sampled sub-areas, the image processing method further comprises adjusting locations of the sampled sub-areas such that a horizontal edge and a vertical edge of a spliced image spliced by images of adjusted sub-areas are respectively aligned.

6. The image processing method of claim 5, further comprising encoding a tile of the spliced image.

7. The image processing method of claim 1, wherein after encoding the images of the sub-areas, the image processing method further comprises:
   independently encapsulating bitstreams corresponding to the images of the sub-areas; and
   encoding location information of the sub-areas to obtain encoded location information of each of the sub-areas, wherein:
   the encoded location information of each of the sub-areas and a bitstream of each of the sub-areas exist in a same track;
   the encoded location information of each of the sub-areas and the bitstream of each of the sub-areas respectively exist in a track of location information and a track of the bitstream of each of the sub-areas;
   the encoded location information of each of the sub-areas exists in a media presentation description (MPD);
   the encoded location information of each of the sub-areas exists in a private file, wherein an address of the private file exists in the MPD; or
   the encoded location information of each of the sub-areas exists in supplemental enhancement information (SEI) of the bitstream of each of the sub-areas.

8. The image processing method of claim 7, further comprising:
   forming, by sampled sub-areas, a sampled longitude-latitude map when the sub-areas are obtained by performing the horizontal division and the vertical division on the longitude-latitude map of the to-be-processed image, wherein the location information comprises either:
   a location and a size of each of the sub-areas in the longitude-latitude map and a location and a size of each of sub-areas in the sampled longitude-latitude map; or
   the location and the size of each of the sub-areas in the longitude-latitude map and a location and a size of each of sub-areas in a spliced image; and
   forming, by the sampled sub-areas, a sampled sphere map when the sub-areas are obtained by performing the horizontal division and the vertical division on the sphere map of the to-be-processed image, wherein the location information comprises either:
   a location and a latitude-longitude range of each of sub-areas in an image of the sphere map and a location and a size of each of sub-areas in an image of the sampled sphere map; or
   the location and the latitude-longitude range of each of the sub-areas in the image of the sphere map and the location and the size of each of the sub-areas in the spliced image.

9. The image processing method of claim 8, further comprising:
   sending, to a terminal, the bitstreams corresponding to the images of the sub-areas;
   receiving visual angle information from the terminal, obtaining, based on the visual angle information, a sub-area corresponding to the visual angle information, and sending a bitstream of the sub-area corresponding to the visual angle information to the terminal; or
   receiving a number of a sub-area from the terminal, and sending a bitstream corresponding to the number of the sub-area to the terminal.

10. The image processing method of claim 7, wherein the private file further comprises information representing a correspondence between a user viewpoint and a number of a sub-area covered by a visual angle of the user viewpoint.

11. The image processing method of claim 7, wherein the private file further comprises information representing a quantity of sub-areas that to be displayed in a sub-area covered by a visual angle of a user, information about a number of the sub-area that to be displayed, and information about a number of a sub-area that is secondarily displayed.

12. The image processing method of claim 1, wherein the longitude-latitude map comprises a longitude-latitude map corresponding to a left eye and a longitude-latitude map corresponding to a right eye, and wherein before performing the horizontal division and the vertical division on the longitude-latitude map or the sphere map of the to-be-processed image, the image processing method further comprises:
  separating the longitude-latitude map corresponding to the left eye from the longitude-latitude map corresponding to the right eye;
  performing the horizontal division and the vertical division on the longitude-latitude map corresponding to the left eye; and
  performing the horizontal division and the vertical division on the longitude-latitude map corresponding to the right eye.

13. The image processing method of claim 1, wherein the longitude-latitude map is a longitude-latitude map of a 360-degree panorama video image or a part of the longitude-latitude map of the 360-degree panorama video image, and wherein the sphere map is a sphere map of the 360-degree panorama video image or a part of the sphere map of the 360-degree panorama video image.

14. The image processing method of claim 1, wherein after encoding the images of the sub-areas, the image processing method further comprises:
  independently encapsulating bitstreams corresponding to the images of the sub-areas; and
  encoding location information of the sub-areas to obtain encoded location information of each of the sub-areas, wherein the encoded location information of each of the sub-areas and a bitstream of each of the sub-areas exist in a same track.

15. An image processing method implemented by a terminal, the image processing method comprises:
  determining first location information of each of a plurality of sub-areas of a panorama image by:
    receiving a media presentation description (MPD) from a server, wherein the MPD comprises either the first location information or an address of a private file, and wherein the private file comprises the first location information; and
    parsing, the MPD to obtain the first location information;
  determining, based on the first location information, second location information of a first sub-area of the plurality of sub-areas covered by a current visual angle in the panorama image;
  determining a first sampling interval of the first sub-area;
  obtaining, a bitstream corresponding to the first sub-area based on the second location information;
  decoding the bitstream to obtain an image of the first sub-area;
  resampling the image based on the second location information and the first sampling interval to obtain a resampled image; and
  playing the resampled image.

16. The image processing method of claim 15, further comprising:
  receiving first information from the server, wherein the first information comprises a track of each of the sub-areas of the panorama image and a bitstream of each of the sub-areas, and wherein the track of each of the sub-areas comprises the first location information; and
  obtaining the first location information based on the track of each of the sub-areas.

17. The image processing method of claim 15, wherein the first location information exists in supplemental enhancement information (SEI) of a bitstream corresponding to each of the sub-areas.

18. The image processing method of claim 15, further comprising determining a preset sampling interval as the first sampling interval.

19. The image processing method of claim 15, further comprising obtaining the first location information based on the track of each of the sub-areas.

20. The image processing method of claim 15, wherein the MPD comprises the address of the private file, and wherein the private file stores description information of sub-area division.

* * * * *